United States Patent
Hand et al.

(10) Patent No.: US 9,107,548 B2
(45) Date of Patent: Aug. 18, 2015

(54) TOILET SEAT HINGE ASSEMBLY

(75) Inventors: Joseph Hand, Sheboygan Falls, WI (US); Brian L. Le Mahieu, Sheboygan, WI (US); Brian A. Henne, Plymouth, WI (US); Randall Grebel, Plymouth, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 192 days.

(21) Appl. No.: 13/994,840

(22) PCT Filed: Mar. 12, 2012

(86) PCT No.: PCT/US2012/028729
§ 371 (c)(1),
(2), (4) Date: Aug. 27, 2013

(87) PCT Pub. No.: WO2012/125535
PCT Pub. Date: Sep. 20, 2012

(65) Prior Publication Data
US 2013/0340154 A1    Dec. 26, 2013

Related U.S. Application Data

(63) Continuation-in-part of application No. PCT/US2011/065315, filed on Dec. 16, 2011.

(60) Provisional application No. 61/451,708, filed on Mar. 11, 2011, provisional application No. 61/514,209, filed on Aug. 2, 2011, provisional application No. 61/550,155, filed on Oct. 21, 2011.

(51) Int. Cl.
*A47K 13/12*    (2006.01)
*F16B 13/12*    (2006.01)
*A47K 13/26*    (2006.01)
*F16B 33/00*    (2006.01)

(52) U.S. Cl.
CPC ............... *A47K 13/12* (2013.01); *F16B 13/128* (2013.01); *A47K 13/26* (2013.01); *F16B 33/00* (2013.01)

(58) Field of Classification Search
CPC . A47K 13/12; E05Y 2900/614; F16B 13/066; F16B 13/128
USPC .................. 4/236, 240; 411/5, 54, 55, 432
See application file for complete search history.

(56) References Cited

U.S. PATENT DOCUMENTS

| | | | |
|---|---|---|---|
| 2,971,425 A | 11/1891 | Thinnes | |
| 784,845 A | 3/1905 | Evans | |
| 2,343,283 A * | 3/1944 | Davis | ............................. 411/53 |
| 3,390,906 A | 7/1968 | Wing | |
| 3,444,775 A | 5/1969 | Hills | |
| 3,561,317 A | 2/1971 | Rowell | |

(Continued)

*Primary Examiner* — Lauren Crane
*Assistant Examiner* — Erin Deery
(74) *Attorney, Agent, or Firm* — Michael Best & Friedrich LLP

(57) ABSTRACT

A hinge assembly for mounting a toilet seat to a toilet bowl includes a hinge post, a threaded fastener extending through the hinge post and configured to extend into a bore in the toilet bowl, a bushing positioned around a portion of the threaded fastener, and a nut threadably coupled to the threaded fastener. The nut includes an expandable section configured to extend into the bore in the toilet bowl. The nut has a surface that is engaged by a surface of the bushing so that the expandable section of the nut expands as the nut moves relative to the threaded fastener to secure the hinge post to the toilet bowl.

29 Claims, 23 Drawing Sheets

(56) References Cited

U.S. PATENT DOCUMENTS

| | | | |
|---|---|---|---|
| 3,568,221 | A | 3/1971 | Haldopoulos |
| 3,699,614 | A | 10/1972 | Stairs |
| 3,742,583 | A | 7/1973 | Devlin et al. |
| 4,011,786 | A | 3/1977 | Liebig |
| 4,015,505 | A | 4/1977 | Murray |
| 4,029,379 | A | 6/1977 | Kotala et al. |
| 4,080,671 | A | 3/1978 | Stahli |
| 4,087,884 | A | 5/1978 | Seiderman |
| 4,148,104 | A | 4/1979 | Ginsburg |
| 4,159,548 | A | 7/1979 | Hewson |
| 4,290,337 | A | 9/1981 | Kuwata et al. |
| 4,293,259 | A | 10/1981 | Liebig |
| 4,314,382 | A | 2/1982 | Ginsburg et al. |
| 4,319,365 | A | 3/1982 | Bemis et al. |
| 4,326,307 | A | 4/1982 | Baillie et al. |
| 4,398,307 | A | 8/1983 | Ginsburg et al. |
| 4,416,048 | A | 11/1983 | Otte |
| 4,467,481 | A | 8/1984 | Ginsburg |
| 4,502,825 | A * | 3/1985 | Yamada ............... 411/5 |
| 4,659,267 | A | 4/1987 | Uno et al. |
| 4,729,703 | A | 3/1988 | Sato |
| 4,819,522 | A | 4/1989 | Stinson |
| 4,878,255 | A | 11/1989 | Grimstad et al. |
| 4,921,381 | A | 5/1990 | Gschwend et al. |
| 4,970,731 | A * | 11/1990 | Fait ............... 4/234 |
| 5,108,238 | A | 4/1992 | Ewing |
| 5,314,277 | A | 5/1994 | Fischer |
| D370,252 | S | 5/1996 | Hulsebus |
| 5,933,875 | A | 8/1999 | Hulsebus et al. |
| 6,012,886 | A | 1/2000 | Tanamura et al. |
| 6,070,295 | A | 6/2000 | Hulsebus |
| 6,101,640 | A * | 8/2000 | Brewer et al. ............... 4/236 |
| 6,234,734 | B1 | 5/2001 | Klippel |
| 6,381,762 | B1 | 5/2002 | Moser |
| 6,454,502 | B1 * | 9/2002 | Cosenza et al. ............... 411/43 |
| 6,763,529 | B1 | 7/2004 | Richter |
| 6,807,686 | B1 | 10/2004 | Janes |
| 6,931,672 | B1 | 8/2005 | Tichter |
| 7,155,748 | B2 | 1/2007 | Vierkant, III et al. |
| 7,203,975 | B2 | 4/2007 | Vierkant, III |
| 7,204,667 | B2 | 4/2007 | Uno et al. |
| 7,281,276 | B2 | 10/2007 | Vierkant, III et al. |
| 7,389,549 | B2 | 6/2008 | Vierkant, III |
| 7,566,195 | B2 | 7/2009 | Hull |
| 7,712,157 | B2 | 5/2010 | Laundre |
| 7,827,626 | B2 | 11/2010 | Zhou |
| 7,845,027 | B2 | 12/2010 | Er et al. |
| 7,857,563 | B2 | 12/2010 | Pratt |
| 7,891,924 | B2 | 2/2011 | Mercer et al. |
| 7,896,598 | B2 | 3/2011 | Mercer et al. |
| 8,281,420 | B2 * | 10/2012 | Hand et al. ............... 4/236 |
| 8,656,522 | B2 * | 2/2014 | Leibfried ............... 4/236 |
| 8,662,805 | B2 * | 3/2014 | Schaeffer et al. ............... 411/3 |
| 8,671,468 | B2 * | 3/2014 | Hand et al. ............... 4/236 |
| 2006/0021120 | A1 | 2/2006 | Nickle |
| 2006/0113504 | A1 | 6/2006 | Tollin |
| 2007/0250996 | A1 | 11/2007 | Li |
| 2008/0172780 | A1 | 7/2008 | Shiau |
| 2008/0213063 | A1 | 9/2008 | Pratt |
| 2008/0219799 | A1 | 9/2008 | Auriol et al. |
| 2008/0226411 | A1 | 9/2008 | McKinlay |
| 2009/0092462 | A1 | 4/2009 | Pratt |
| 2009/0113610 | A1 | 5/2009 | Lin et al. |
| 2009/0191020 | A1 | 7/2009 | Pratt |
| 2009/0211005 | A1 | 8/2009 | Hand et al. |
| 2009/0226278 | A1 | 9/2009 | Pratt |
| 2010/0074710 | A1 | 3/2010 | Auriol et al. |
| 2010/0150681 | A1 | 6/2010 | David et al. |
| 2010/0260572 | A1 | 10/2010 | Wehrmeister et al. |
| 2010/0275353 | A1 | 11/2010 | Gong |
| 2011/0000010 | A1 | 1/2011 | Henne |
| 2011/0058916 | A1 | 3/2011 | Toosky |
| 2012/0042502 | A1 | 2/2012 | Wenfeng et al. |

* cited by examiner

TOILET SEAT HINGE ASSEMBLY

CROSS-REFERENCE TO RELATED APPLICATIONS

This application claims priority to U.S. Provisional Patent Application No. 61/451,708, filed Mar. 11, 2011, to U.S. Provisional Patent Application No. 61/514,209, filed Aug. 2, 2011, to U.S. Provisional Patent Application No. 61/550,155, filed Oct. 21, 2011, and to International Application No. PCT/US2011/065315, filed Dec. 16, 2011, the entire contents of all of which are incorporated by reference herein.

FIELD OF THE INVENTION

The present invention relates to hinge assemblies for mounting toilet seats and/or lids to toilet bowls.

SUMMARY

In one embodiment, the invention provides a hinge assembly for mounting a toilet seat to a toilet bowl. The hinge assembly includes a hinge post, a threaded fastener extending through the hinge post and configured to extend into a bore in the toilet bowl, a bushing positioned around a portion of the threaded fastener, and a nut threadably coupled to the threaded fastener. The nut includes an expandable section configured to extend into the bore in the toilet bowl. The nut has a surface that is engaged by a surface of the bushing so that the expandable section of the nut expands as the nut moves relative to the threaded fastener to secure the hinge post to the toilet bowl.

In another embodiment, the invention provides a fastener assembly including a threaded fastener having a first end portion and a second end portion, and an adaptor having a first segment coupled to the first end portion of the threaded fastener, a second segment, and a shear segment connecting the first and second segments. The first and second segments are both configured to be engaged by a tool to rotate the threaded fastener. The shear segment has a lower torque resistance than the first and second segments such that the shear segment breaks when a torque applied to the second segment reaches a predetermined amount. The fastener assembly also includes a nut threadably coupled to the second end portion of the threaded fastener and a bushing positioned around a portion of the threaded fastener between the adaptor and the nut. One of the nut and the bushing includes an expandable section. The expandable section has a surface that is engaged by a surface of the other of the nut and the bushing so that the expandable section expands as the nut moves relative to the threaded fastener.

In yet another embodiment, the invention provides a hinge assembly for mounting a toilet seat to a toilet bowl. The hinge assembly includes a hinge post defining an opening and including an upper surface that surrounds the opening, and a threaded fastener extending through the opening of the hinge post and configured to extend into a bore in the toilet bowl. The threaded fastener has a first end portion and a second end portion. The hinge assembly also includes an adaptor having a first segment coupled to the first end portion of the threaded fastener, a second segment, and a shear segment connecting the first and second segments. The first and second segments are both configured to be engaged by a tool to rotate the threaded fastener. The shear segment has a lower torque resistance than the first and second segments such that the shear segment breaks when a torque applied to the second segment reaches a predetermined amount. The hinge assembly further includes a bushing positioned around a portion of the threaded fastener. The bushing has a flange and a lower section configured to extend into the bore in the toilet bowl. The flange is supported by the upper surface of the hinge post over the opening. The lower section has an outer diameter that is smaller than the opening in the hinge post such that the hinge post is movable relative to the threaded fastener and the bushing to adjust a position of the hinge post on the toilet bowl. The hinge assembly also includes a nut threadably coupled to the second end portion of the threaded fastener. The nut includes an expandable upper section configured to extend into the bore in the toilet bowl. The nut has a surface that is engaged by a surface of the bushing so that the expandable section of the nut expands as the nut moves relative to the threaded fastener to secure the hinge post to the toilet bowl.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
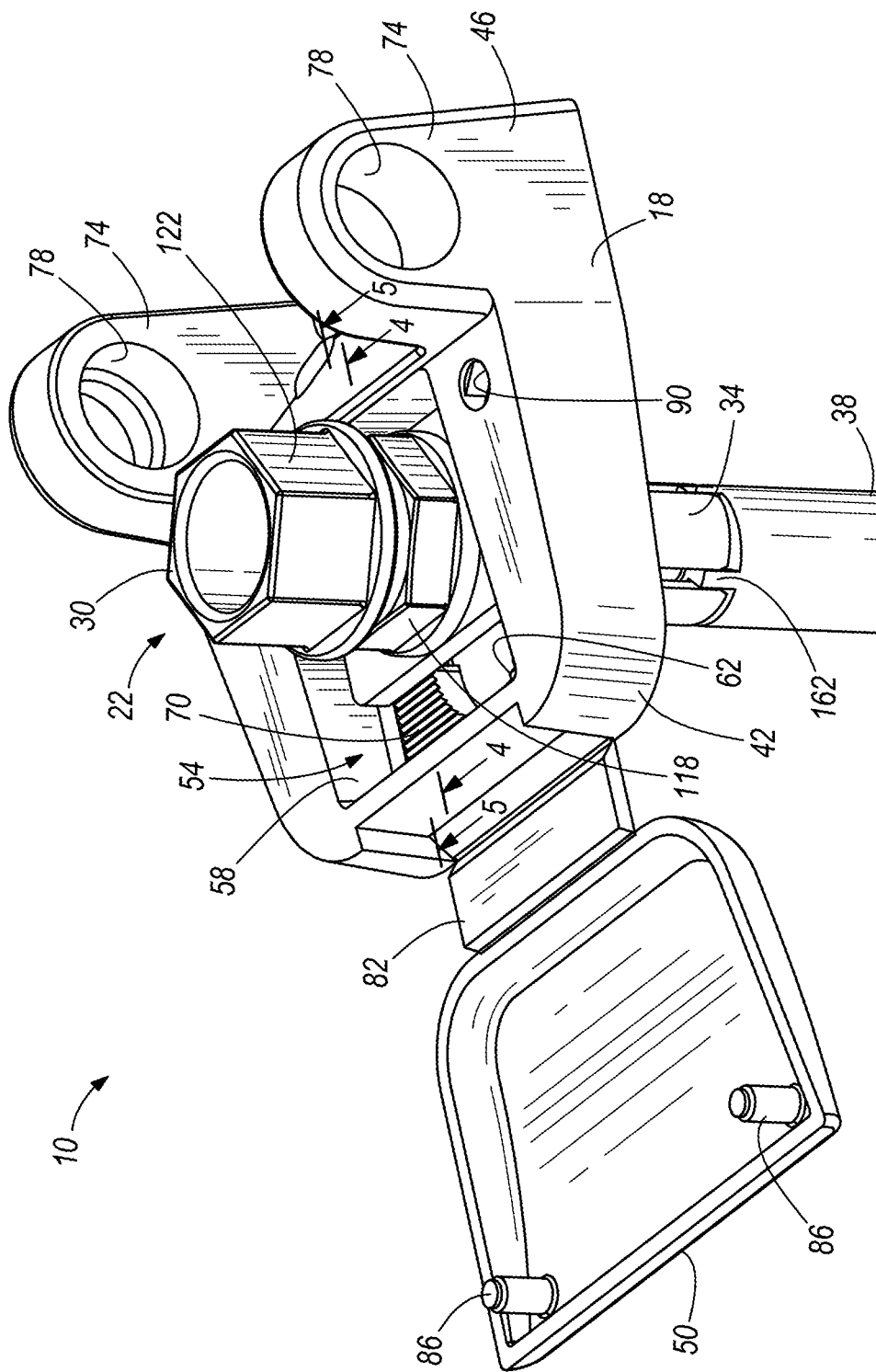
FIG. 1 is a perspective view of a hinge assembly embodying the invention.
Figure 2:
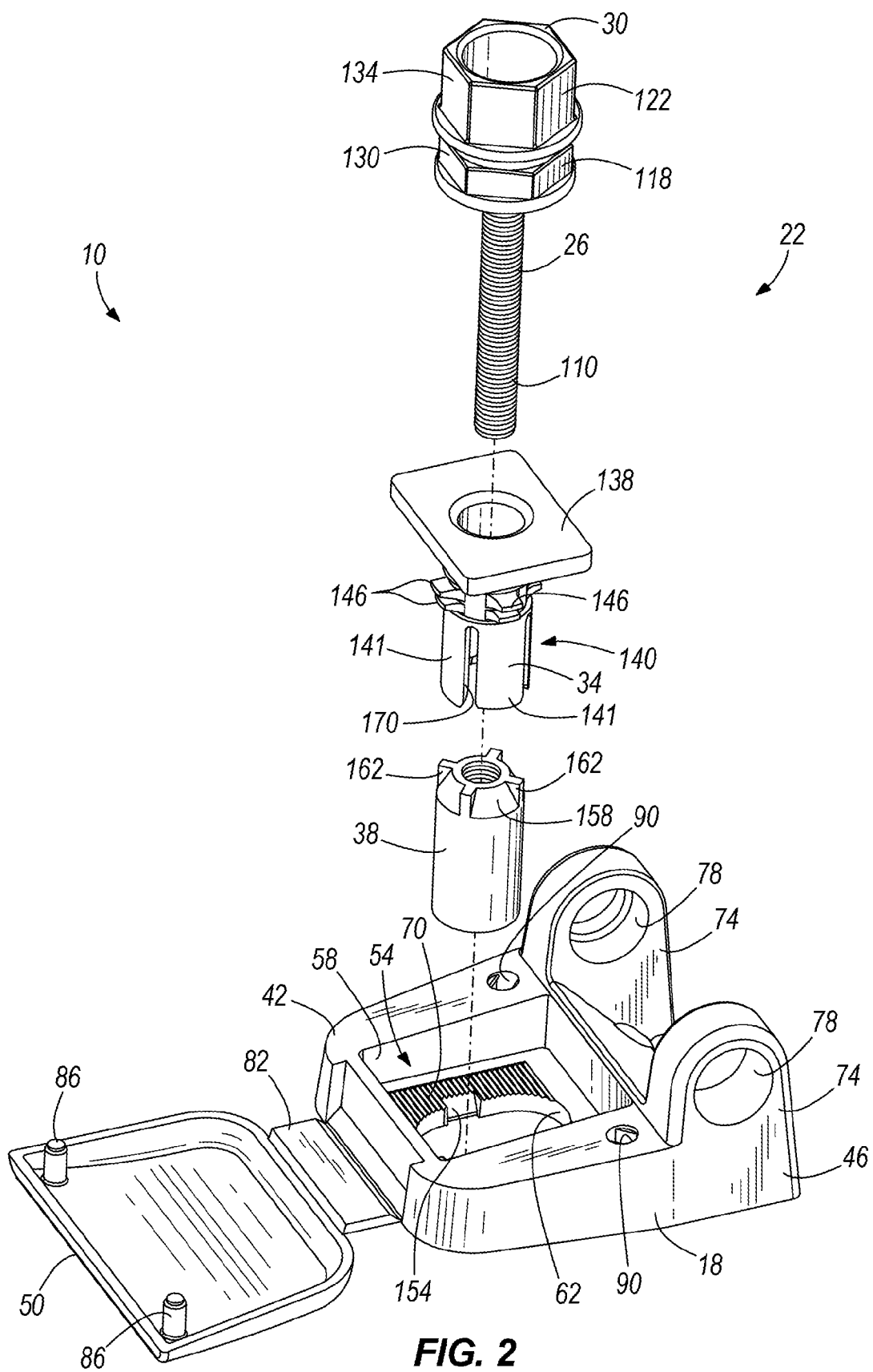
FIG. 2 is an exploded perspective view of the hinge assembly shown in FIG. 1.
Figure 4:
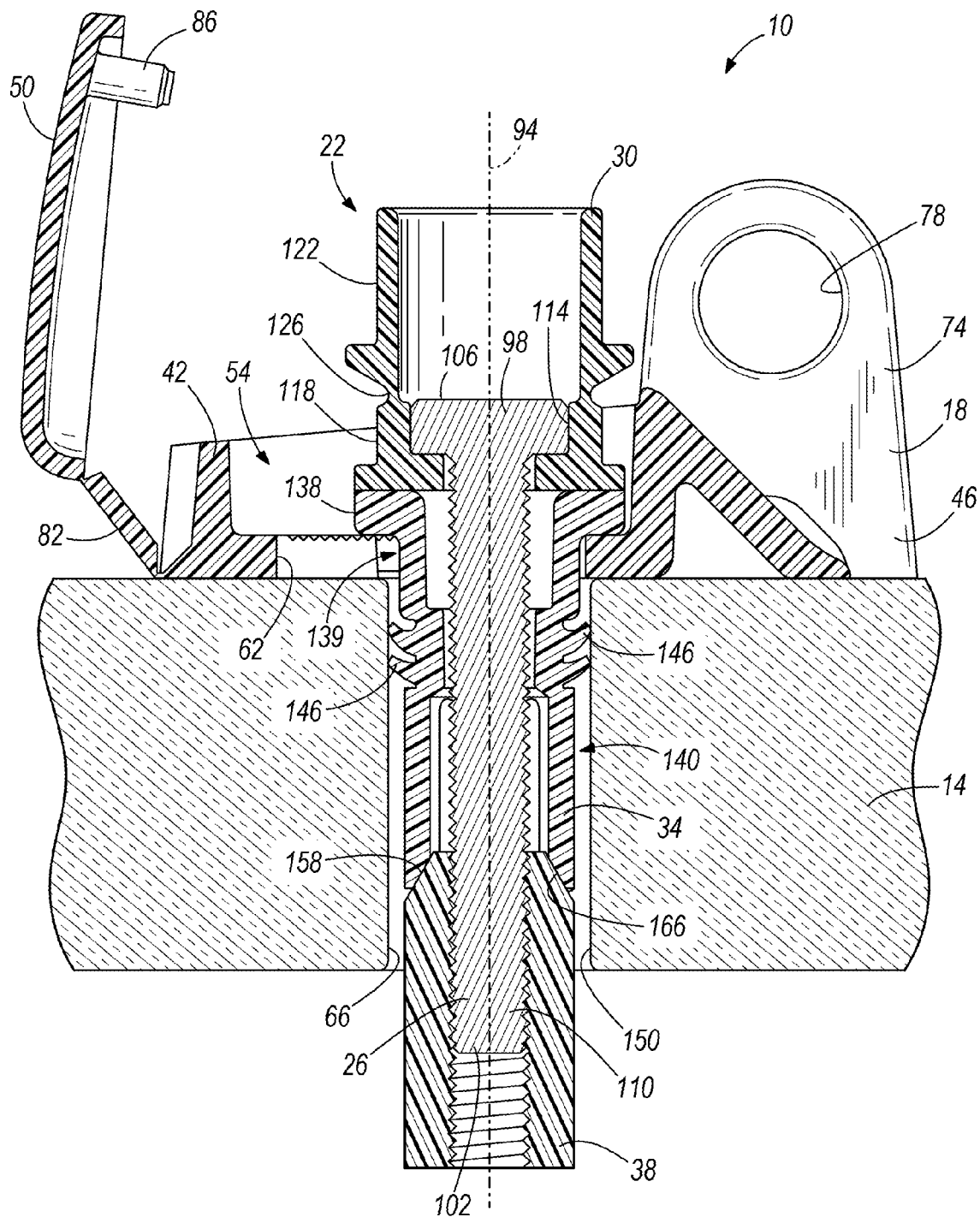
FIG. 4 is a cross-sectional view of the hinge assembly taken along section line 4-4 of FIG. 1.
Figure 6:
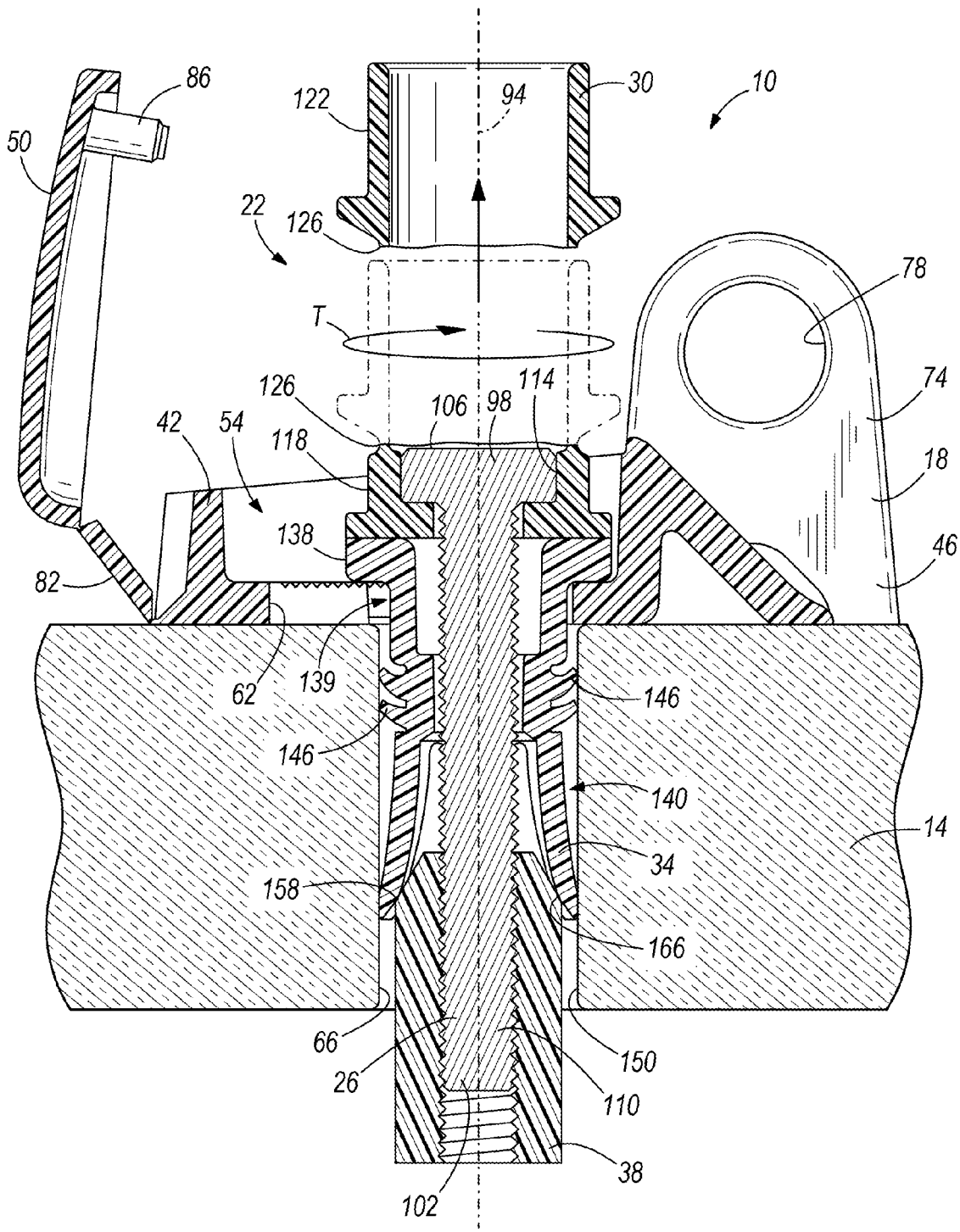
FIG. 6 is another cross-sectional view of the hinge assembly illustrating a portion of the adaptor shearing off a threaded fastener and illustrating a bushing expanding within a bore of a toilet bowl.
Figure 7:
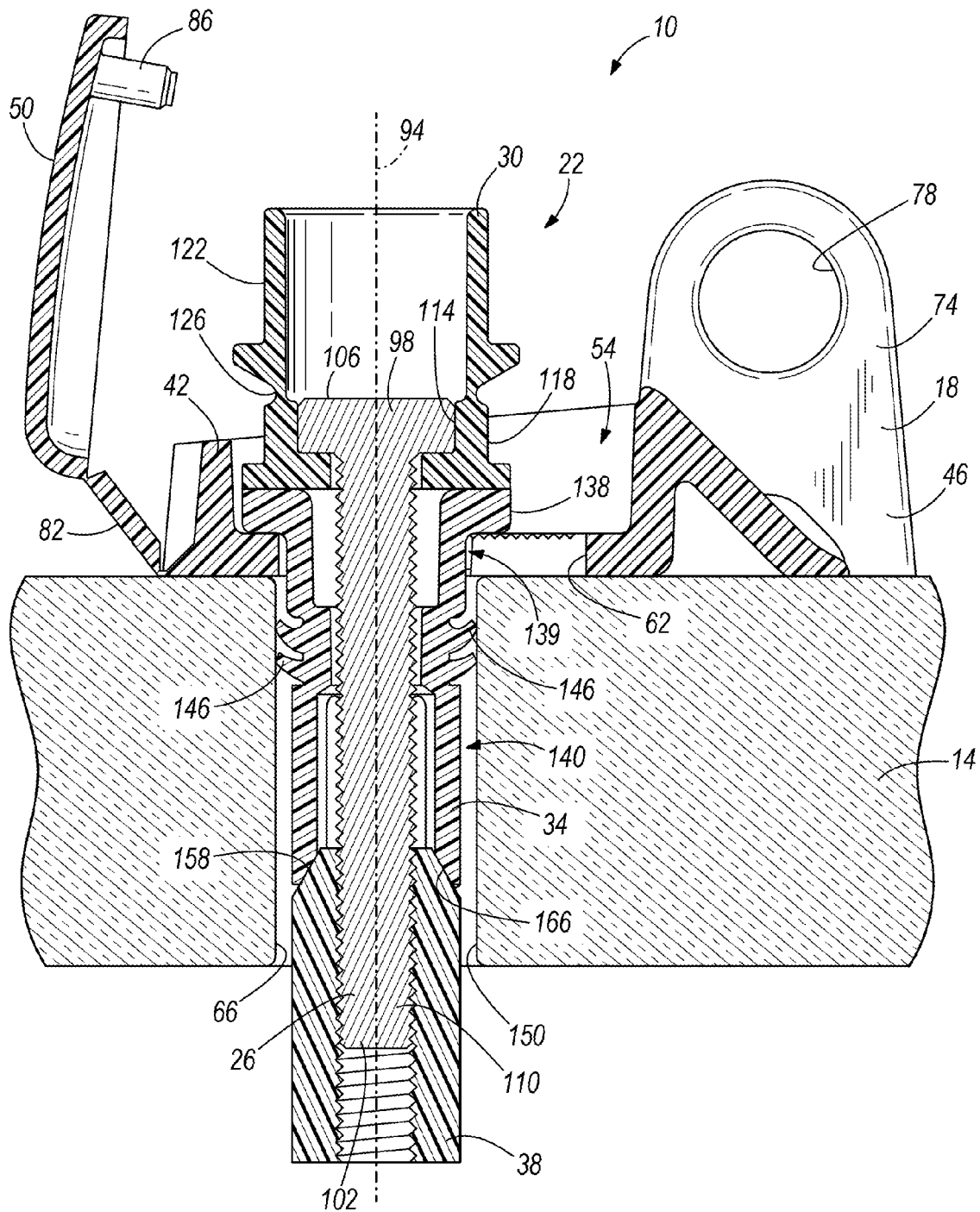
FIG. 7 is another cross-sectional view of the hinge assembly illustrating a hinge post moved relative to the threaded fastener and the bore of the toilet bowl.

FIGS. 1 and 2 illustrate a toilet seat hinge assembly 10 for mounting a toilet seat, or ring, and/or lid to a toilet bowl 14 (FIGS. 4, 6, and 7). The hinge assembly 10 includes a hinge post 18 and a fastener assembly 22 to secure the hinge post 18 to the toilet bowl 14. The fastener assembly 22 includes a threaded fastener 26, an adaptor 30, an expandable bushing 34, and a nut 38. Although only one hinge assembly 10 is shown, it should be readily apparent that a toilet typically includes two similar hinge assemblies 10 to mount the toilet seat and/or lid to the bowl 14.

The hinge post 18 includes a base portion 42, a post portion 46, and a cover or cap 50. The base portion 42 is configured to sit on the toilet bowl 14 and defines a recessed area 54. The recessed area 54 is bound by an upwardly-extending sidewall 58 of the base portion 42. The recessed area 54 is shaped and sized to receive portions of the threaded fastener 26 and the bushing 34 when the hinge post 18 is positioned on the toilet bowl 14. An opening 62 is formed through the base portion 42 in communication with the recessed area 54. The illustrated opening 62 is an elongated opening that receives the threaded fastener 26 to align the fastener 26 with a bore 66 (FIGS. 4, 6, and 7) in the bowl 14. The elongated opening 62 allows the position of the hinge post 18 to be adjusted relative to the fastener 26 and the bore 66. That is, the opening 62 allows the hinge post 18 to be moved laterally on the bowl 14 to accommodate and compensate for different sizes of toilet bowls and seats. For example, as shown in FIG. 4, the hinge post 18 is slid so that the fastener assembly 22 is at the right end of the opening 62 (i.e., the end adjacent the post portion 46) to move the toilet seat and/or lid rearward on the toilet bowl 14. Similarly, as shown in FIG. 7, the hinge post 18 is slid so that the fastener assembly 22 is at the left end of the opening 62 (i.e., the end adjacent the cover 50) to move the toilet seat and/or lid forward on the toilet bowl 14. Referring back to FIG. 2, a series of ridges or teeth 70 is formed on an upper surface of the base portion 42 that surrounds the elongated opening 62.

The post portion 46 includes two legs 74 extending perpendicularly from the base portion 42. Each leg 74 defines a bore 78 for receiving a pin. The pin pivotally mounts one or more hinge leaves to the hinge post 18 to pivotally couple the toilet seat and/or lid to the hinge assembly 10.

The cover 50 is coupled to the base portion 42 by a living hinge 82. The cover 50 is movable between an open position (FIG. 1) and a closed position. When in the open position, the cover 50 allows access to the recessed area 54 of the base portion 42. When in the closed position, the cover 50 substantially covers the recessed area 54 to provide a clean appearance for the hinge assembly 10. The cover 50 includes two bosses 86 that are configured to be received in corresponding apertures 90 in the base portion 42 when the cover 50 is closed. The bosses 86 and the apertures 90 create interference fits to releasably secure the cover 50 in the closed position.

The threaded fastener 26 extends through the opening 62 in the hinge post 18 and the bore 66 in the toilet bowl 14 to secure the hinge post 18 to the bowl 14. As shown in FIG. 4, the fastener 26 defines a longitudinal axis 94 extending through a first or upper end portion 98 and a second or lower end portion 102 of the fastener 26. The illustrated threaded fastener 26 is a steel or stainless steel bolt having a head 106 and a shaft 110. The illustrated head 106 is, for example, a conventional hex-shaped head formed on the first end portion 98 of the fastener 26 and is received in the adaptor 30. The shaft 110 extends from the head 106 through the bore 66 in the toilet bowl 14. In some embodiments, the shaft 110 has a diameter between approximately 3/16 inch and approximately 3/8 inch. In the illustrated embodiment, the shaft 110 has a diameter of approximately 1/4 inch.

Figure 3:
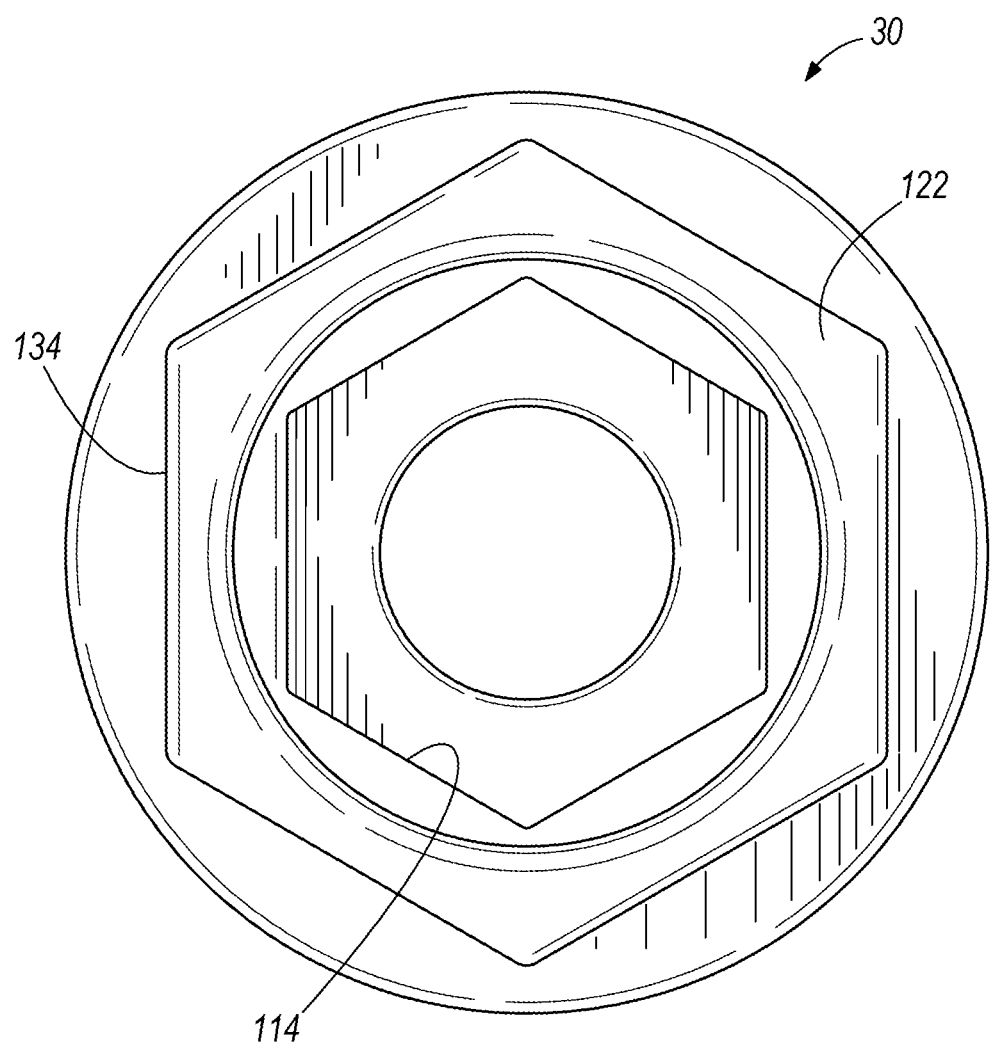
FIG. 3 is a top view of an adaptor for use with the hinge assembly shown in FIG. 1.

As shown in FIGS. 2 and 4, the adaptor 30 is coupled to the upper end portion 98 of the fastener 26. The adaptor 30 may be composed of a plastic material such as, for example, 30% glass filled nylon. As shown in FIG. 3, the adaptor 30 includes a hex-shaped inner surface 114 that is configured to receive the hex-shaped head 106 of the fastener 26. Referring back to FIGS. 2 and 4, the head 106 is pressed into the adaptor 30 to inhibit rotation of the adaptor 30 relative to the fastener 26. In some embodiments, the adaptor 30 may be molded directly to the threaded fastener 26. In such embodiments, the fastener 26 may include any suitable projection or projections that the adaptor 30 can be molded onto to inhibit relative rotation between the adaptor 30 and the fastener 26.

The illustrated adaptor 30 includes a first or lower segment 118 coupled to the upper end portion 98 of the threaded fastener 26, a second or upper segment 122, and a middle shear segment 126 connecting the first and second segments 118, 122. The segments 118, 122, 126 are coaxially aligned along the longitudinal axis 94. The first and second segments 118, 122 both include hex-shaped outer surfaces 130, 134 that are configured to be engaged by a tool (e.g., a wrench, a pliers, etc.) to rotate the adaptor 30 and the fastener 26 about the longitudinal axis 94. The shear segment 126 is relatively thinner than the first and second segments 118, 122 such that the shear segment 126 has a lower torque resistance than the first and second segments 118, 122. Referring to FIG. 6, when a predetermined torque T is applied to the second segment 122, the shear segment 126 breaks, separating the second segment 122 from the first segment 118 and leaving the first segment 118 on the fastener 26. Such an arrangement inhibits over-tightening of the fastener 26 and removes excess material from the adaptor 30 so that the cover 50 of the hinge post 18 can be closed.

Figure 5:
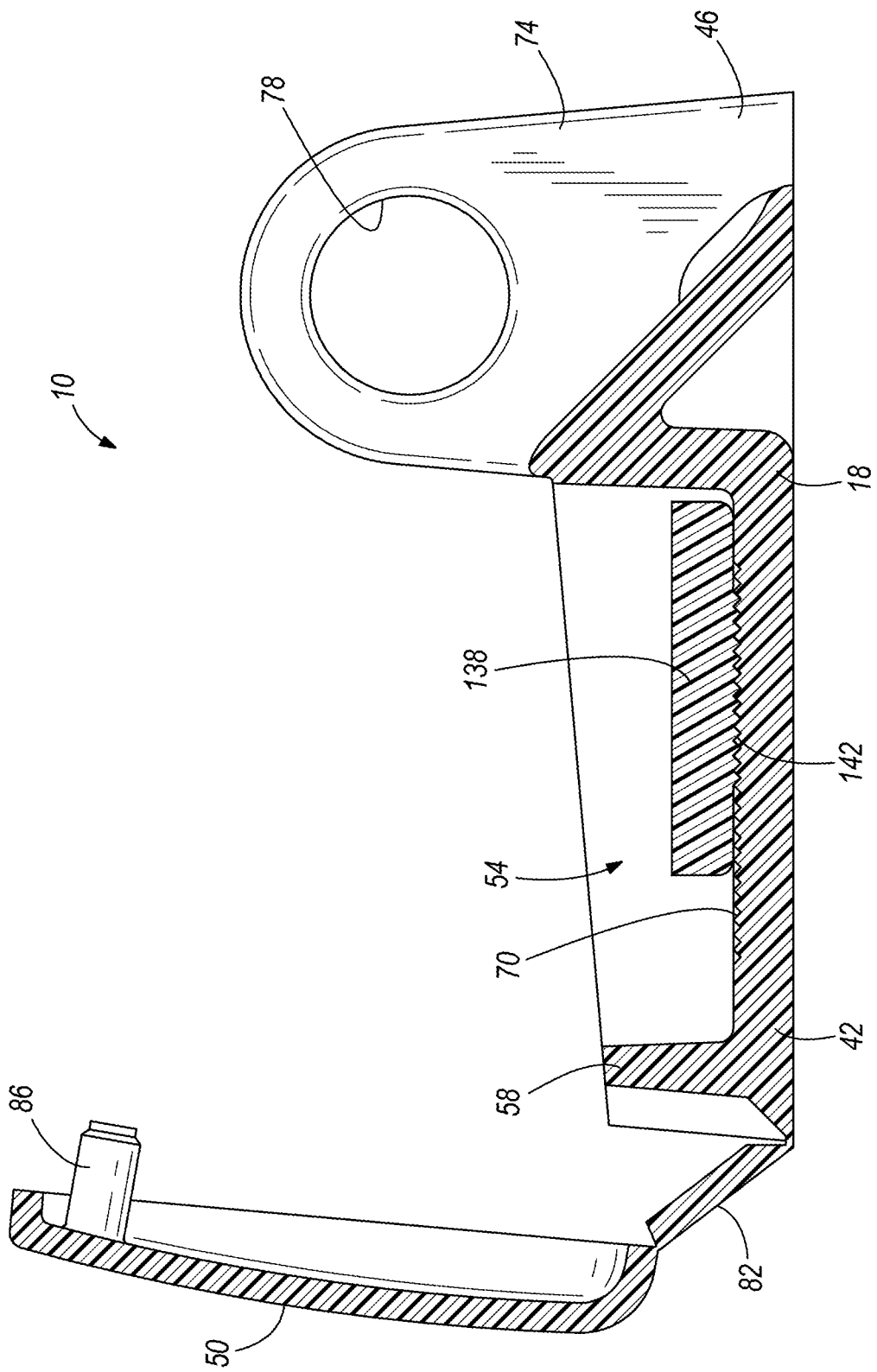
FIG. 5 is a cross-sectional view of the hinge assembly taken along section line 5-5 of FIG. 1.

As shown in FIGS. 2 and 4, the bushing 34 extends into the bore 66 in the toilet bowl 14, and the fastener 26 is inserted into the bushing 34 such that the bushing 34 is positioned around a portion of the fastener 26. The bushing 34 may be composed of a plastic material such as, for example, 20% glass filled homopolymer polypropylene (HOPP). The bushing 34 includes a flange 138 formed at the upper end of the bushing 34, an upper section 139 below the flange 138, and an expandable lower section 140. The lower section 140 includes four axially extending segments 141 separated by slots 170 and has an outer diameter that is smaller than the opening 62 in the hinge post 18 and the bore 66 in the toilet bowl 14. The slots 170 are spaced approximately ninety degrees apart around the bushing 34. The flange 138 is captured between the adaptor 30 and the base portion 42 of the hinge post 18. As shown in FIG. 5, a series of ridges or teeth 142 is formed on an underside, or lower surface, of the flange 138. The ridges 142 on the flange 138 engage the corresponding ridges 70 on the base portion 42 to inhibit lateral movement of the bushing 34 relative to the hinge post 18 when the fastener 26 is tightened.

As shown in FIG. 4, the bushing 34 is capable of conforming to the various dimensions and shapes of mounting holes in toilet bowls. To this end, the bushing 34 includes projections 146 extending radially outward from the upper section 139. In the illustrated embodiment, the bushing 34 includes four sets of two projections 146. In other embodiments, the bushing 34 may include fewer or more projections 146. The projections 146 engage an inner surface 150 of the mounting hole or bore 66. The projections 146 deform and conform to the shape of the bore 66 and align the bushing 34 within the bore 66. The illustrated projections 146 extend radially outward a greater distance than the diameter of the bore 66 such that the projections 146 deflect upwardly when the bushing 34 is inserted into the bore 66. Cutouts 154 (FIG. 2) are formed in the base portion 42 adjacent the elongated opening 62 to provide clearance for the projections 146 when the bushing 34 is inserted through the opening 62.

The nut 38 is threadably coupled to the lower end portion 102 of the threaded fastener 26. The nut 38 is configured to expand the expandable bushing 34 as the fastener 26 is rotated about the axis 94 to secure the hinge post 18 to the toilet bowl 14. The illustrated nut 38 is generally cylindrical and includes a tapered or frustoconical upper surface 158 that engages a corresponding inner surface 166 on the segments 141 of the bushing 34. The nut 38 has an outer diameter that is smaller than the opening 62 in the hinge post 18 and the bore 66 in the toilet bowl 14 such that the nut 38 can be dropped through the opening 62 and the bore 66 with the fastener 26 and the bushing 34. The nut 38 also has four ribs 162 (FIG. 2) extending from the surface 158. The ribs 162 are spaced approximately ninety degrees apart around the nut, and the ribs 162 fit within the slots 170 in the bushing 34.

As the fastener 26 is rotated relative to the hinge post 18, the ribs 162 inhibit the nut 38 from rotating relative to the bushing 34 with the fastener 26. Rather, as shown in FIG. 6, the nut 38 moves axially along the shaft 110 toward the hinge post 18. The nut 38 has a larger outer diameter than the inner diameter of the bushing 34 such that the tapered surface 158 pushes the bushing segments 141 radially outward to expand the bushing 34. As the bushing 34 expands, the segments 141 engage the inner surface 150 of the bore 66 to secure the bushing 34 and the threaded fastener 26 within the bore 66, thereby securing the hinge post 18 to the toilet bowl 14. As the bushing 34 engages the inner surface 150 of the bore 66, the bushing 34 also increases the torque required for rotating the fastener 26 to the predetermined torque T that is necessary to break the shear segment 126 of the adaptor 30 and separate the second segment 122 from the first segment 118.

The illustrated fastener assembly 22 facilitates rapid installation of the toilet seat hinge assembly 10 on a toilet bowl. The threaded fastener 26, the adaptor 30, the bushing 34, and the nut 38 can be preassembled as a single unit and then inserted through the elongated opening 62 of the hinge post 18 and into a bore of a toilet bowl to secure the hinge post 18 to the bowl. In addition, the nut 38 is keyed to the bushing 34 such that a user does not need to grasp and hold the nut 38 when rotating the adaptor 30 and the fastener 26. Instead, the user only needs to rotate the adaptor 30 until the shear segment 126 breaks to secure the hinge assembly 10 in place. This arrangement allows the fastener assembly 22 to be top-installed and top-tightened in restricted areas, such as on toilet bowls with blind bores. Furthermore, the fastener 26 is sized (e.g., between approximately 3/16 inch and 3/8 inch in diameter) to work with the normal variation of toilet bowl bore sizes.

Figure 8:
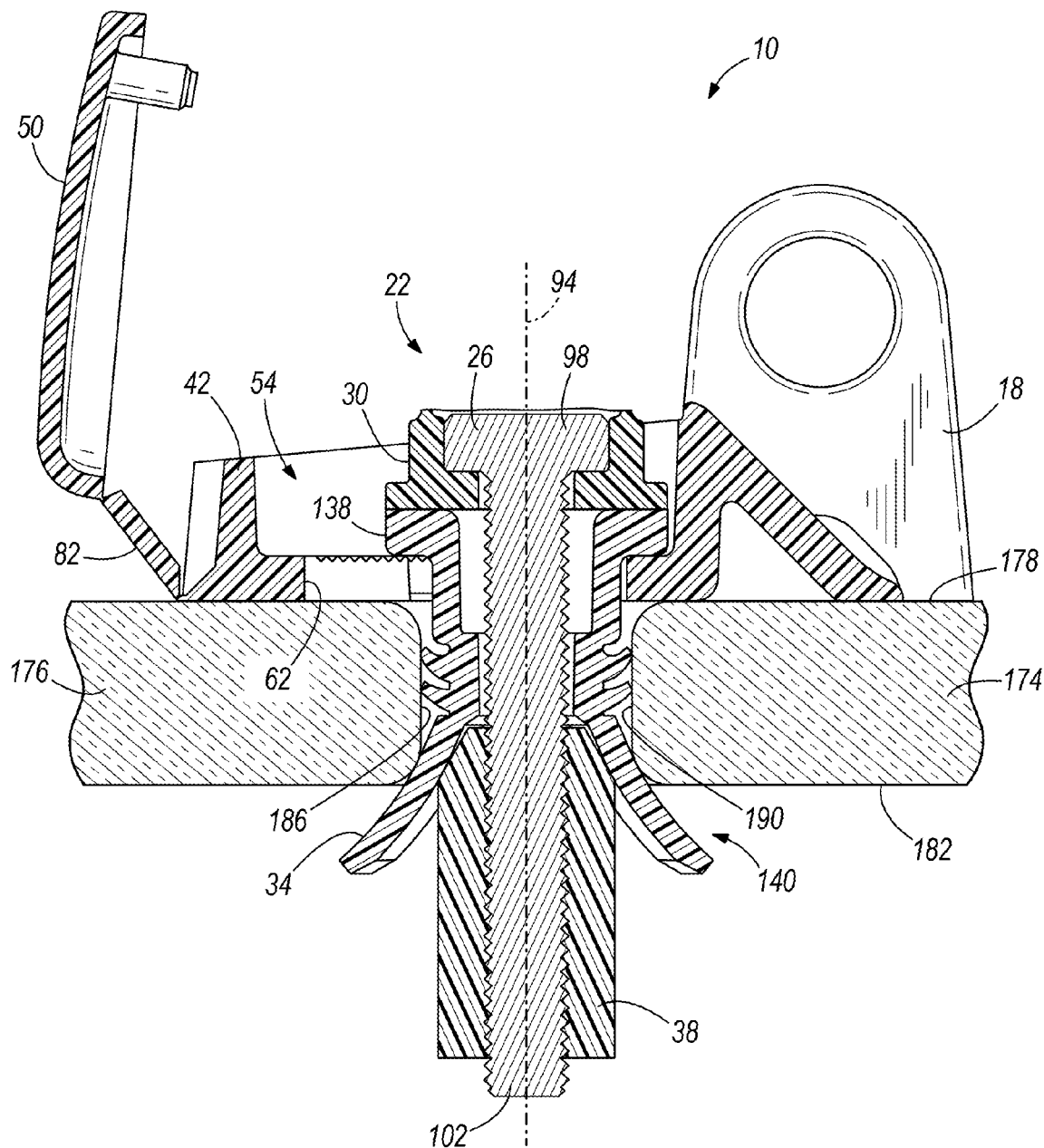
FIG. 8 is a cross-sectional view of the hinge assembly illustrating the hinge assembly mounted to another toilet bowl.

FIG. 8 illustrates the toilet seat hinge assembly 10 mounted to another toilet bowl 174. The illustrated toilet bowl 174 has a flange 176 that is generally thinner than the flange of the toilet bowl 14 shown in FIGS. 4, 6, and 7. For example, the flange 176 may have a thickness, measured generally parallel to the longitudinal axis 94, of approximately 0.5 inches. In addition, the flange 176 has larger radii that transition from a top surface 178 and a bottom surface 182 of the bowl 174 to a bore 186 through the bowl 174. In some embodiments, the radii may be between approximately 0.12 inches and approximately 0.25 inches.

In the illustrated embodiment, a substantial portion of the expandable lower section 140 of the bushing 34 extends out of the bore 186 past the bottom surface 182 of the toilet bowl flange 176. As the fastener 26 is rotated to tighten the nut 38, the lower section 140 not only grips an inner surface 190 of the bore 186, but also expands into the radius below the bore 186 to provide some degree of axial clamping. This axial clamping increases the security of the hinge assembly 10 on the bowl 174. The nut 38 is also moved axially further toward the hinge post 18 such that the second end portion 102 of the fastener 26 extends out of and beyond the nut 38.

Figure 9:
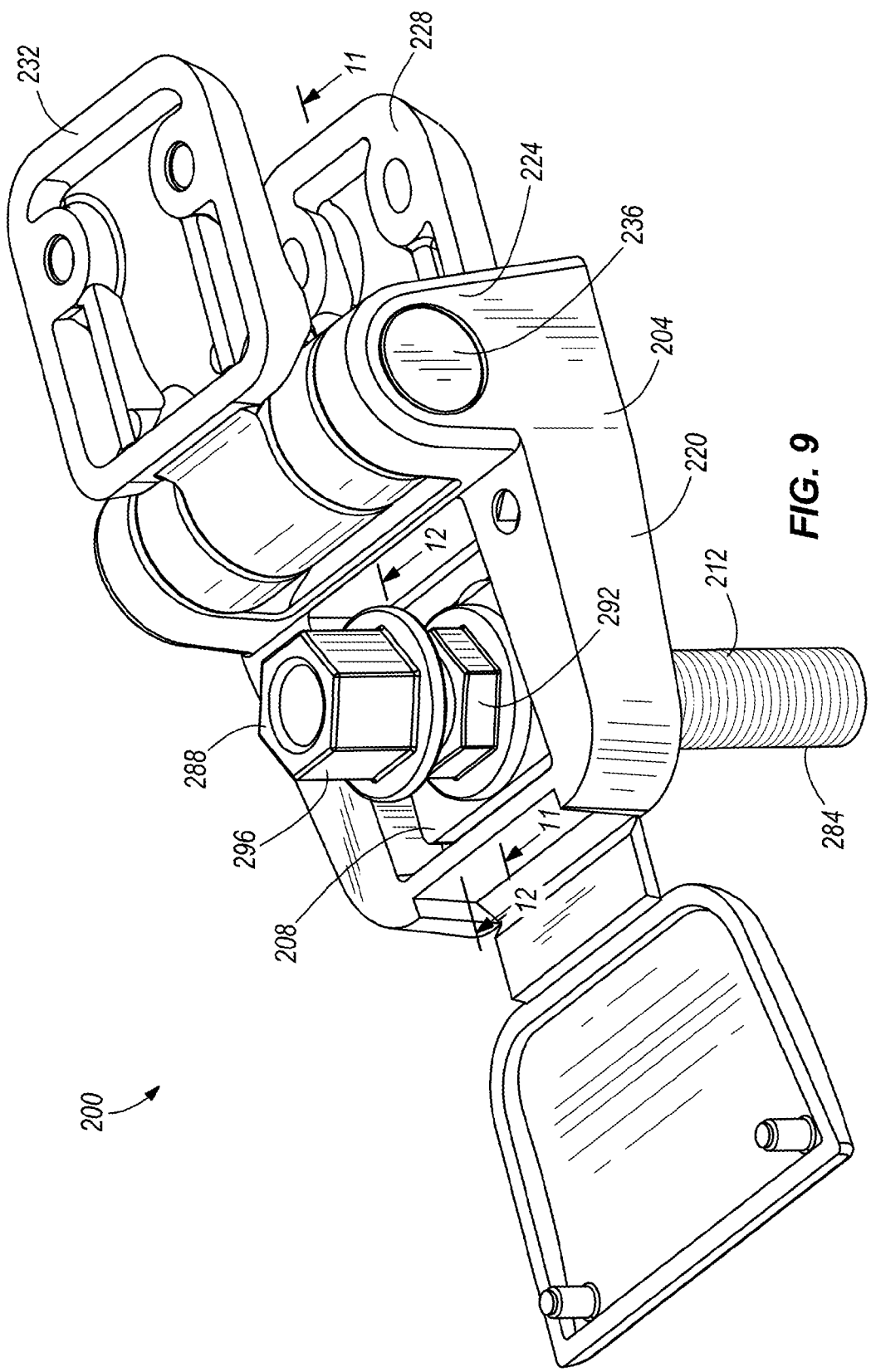
FIG. 9 is a perspective view of another hinge assembly embodying the invention.
Figure 10:
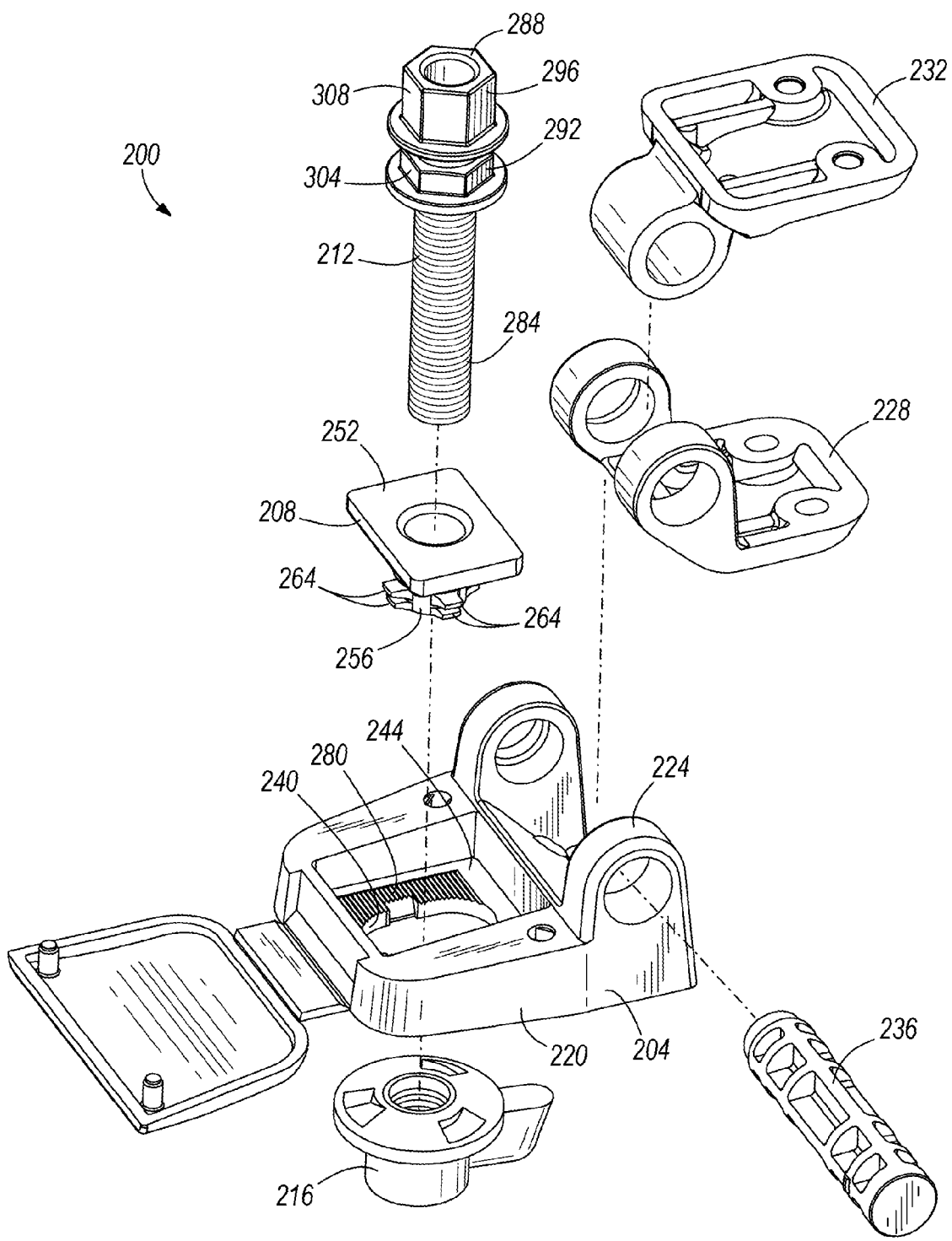
FIG. 10 is an exploded perspective view of the hinge assembly shown in FIG. 9.
Figure 11:
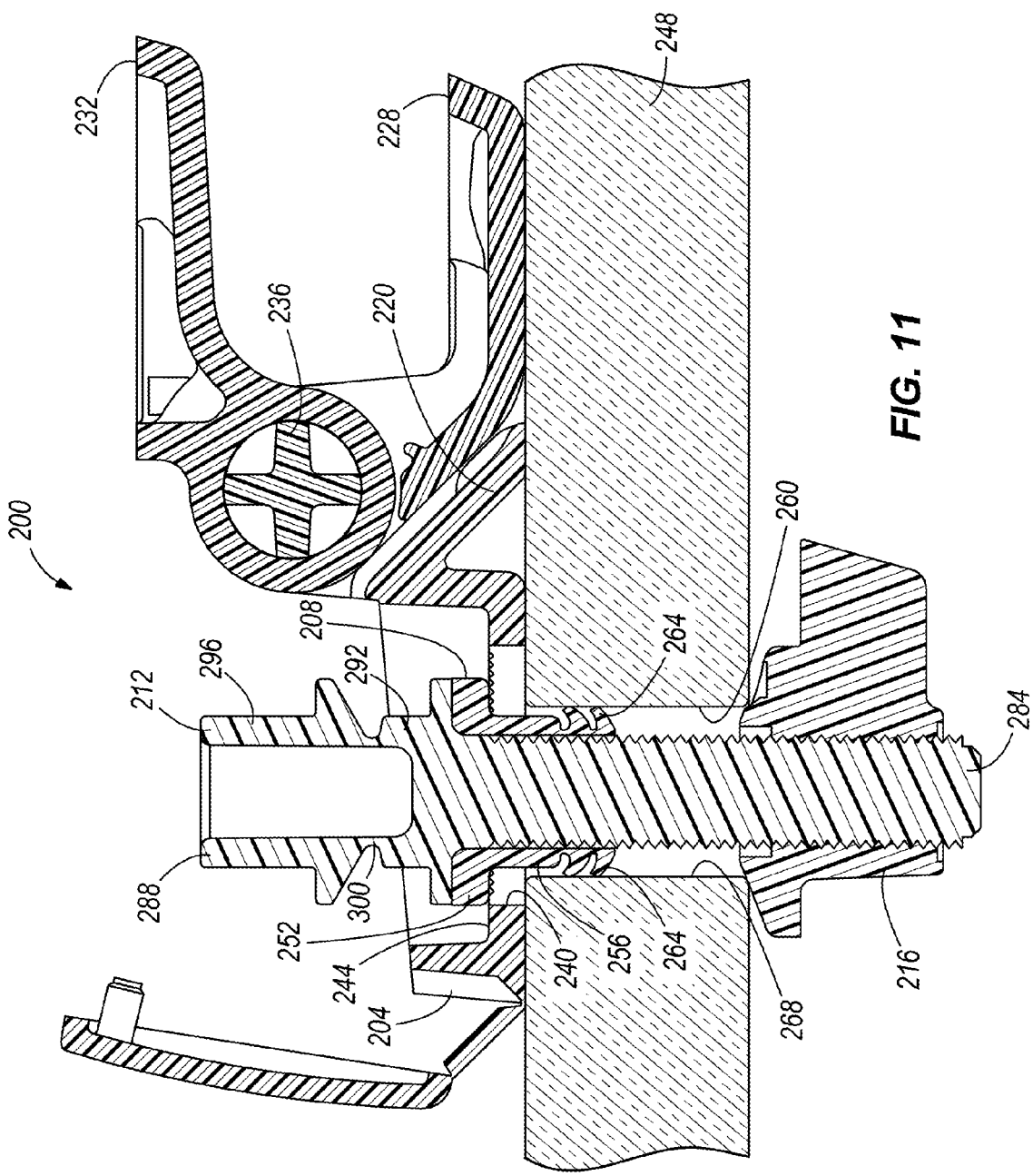
FIG. 11 is a cross-sectional view of the hinge assembly taken along section line 11-11 of FIG. 9.

FIGS. 9 and 10 illustrate another embodiment of a toilet seat hinge assembly 200. The hinge assembly 200 includes a hinge post 204, a bushing 208, a threaded fastener 212, and a nut 216. The hinge post 204 includes a base portion 220 and a post portion 224. Two hinge leaves 228, 232 are pivotally coupled to the post portion 224 by a pin 236. As shown in FIGS. 10 and 11, the base portion 220 defines an elongated opening 240, or slot, and includes an upper surface 244 that surrounds the opening 240. The opening 240 allows for lateral adjustment of a toilet seat on a toilet bowl 248 (FIG. 11), as further described below.

The illustrated bushing 208 includes a rectangular flange 252 and a lower section 256. The lower section 256 extends through the opening 240 of the hinge post 204 and into a bore 260 (FIG. 11) in the toilet bowl 248. The bushing 208 also includes four sets of two projections 264 extending radially outward from the lower section 256. The sets of projections 264 are spaced approximately 90 degrees apart from each other. As shown in FIG. 11, the projections 264 engage an inner surface 268 of the toilet bowl 248 that defines the bore 260. The projections 264 deflect as the bushing 208 is inserted into the bore 260 to help position and secure the bushing 208 within the bore 260.

Figure 12:
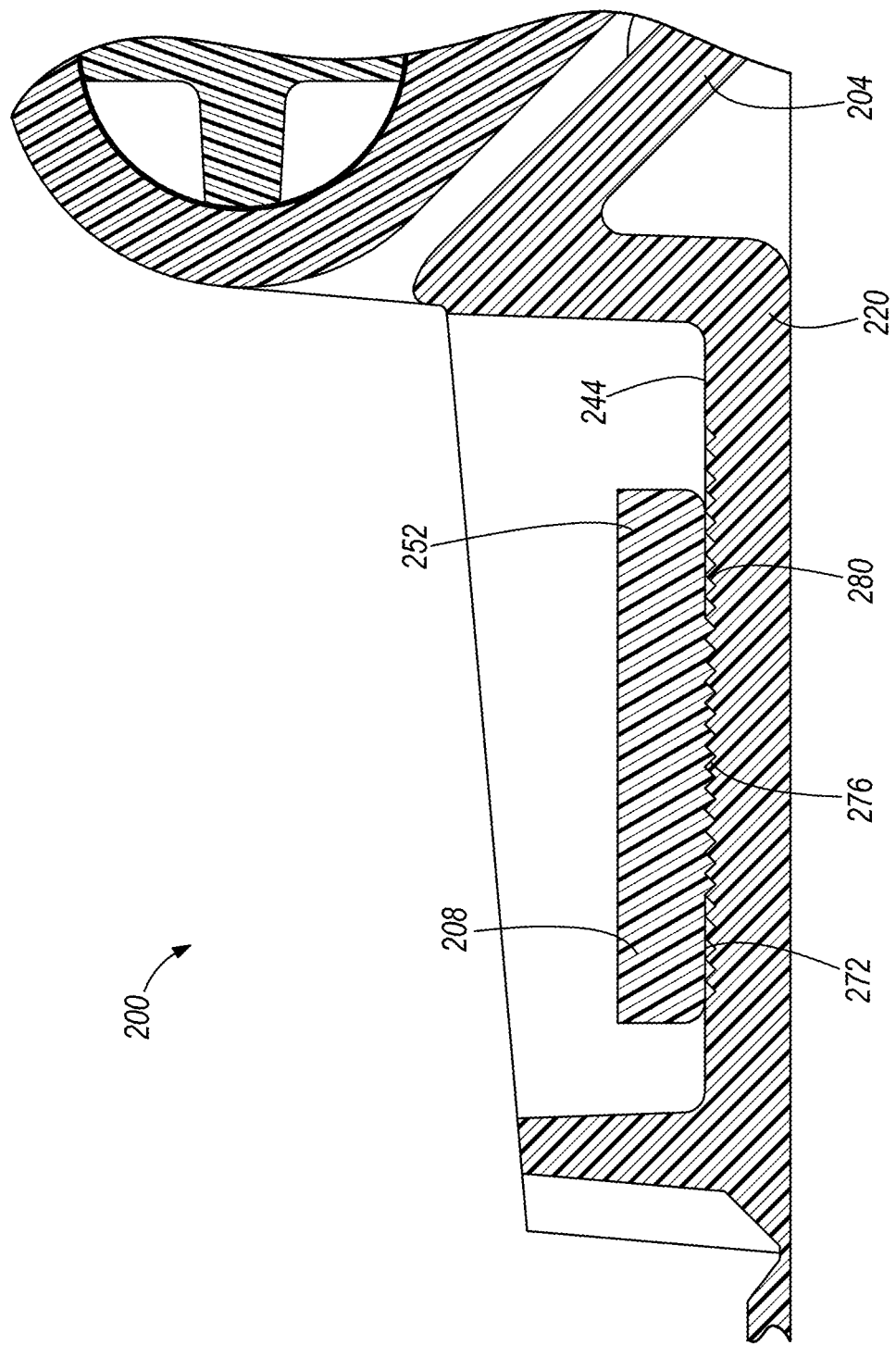
FIG. 12 is a cross-sectional view of the hinge assembly taken along section line 12-12 of FIG. 9.

The flange 252 is supported on the upper surface 244 of the hinge post 204 over the opening 240. As shown in FIG. 12, the flange 252 includes a lower surface 272 and a series of teeth 276 formed on the lower surface 272. The teeth 276 engage a similar series of teeth 280 formed on the upper surface 244 of the hinge post 204. The teeth 276, 280 securely intermesh with each other when the flange 252 is clamped down onto the hinge post 204 by the threaded fastener 212 and the nut 216, inhibiting movement of the hinge post 204 relative to the bushing 208 and the fastener 212. When the threaded fastener 212 is loosened, the teeth 276, 280 disengage, allowing for movement of the hinge post 204. In particular, the elongated opening 240 allows the hinge post 204 to slide horizontally along the toilet bowl 248 (FIG. 11) to adjust a position of the hinge post 204, and thereby the toilet seat and/or lid, in a front-to-back direction.

As shown in FIGS. 10 and 11, the illustrated threaded fastener 212 is a shear bolt that functions in the same manner as the threaded fastener 26 and the adaptor 30 of FIGS. 1-8. The fastener 212 includes a threaded portion 284, or shaft, and a head portion 288 having a first segment 292, a second segment 296, and a shear segment 300. In the illustrated embodiment, the entire fastener 212, including the threaded shaft 284, the first segment 292, the second segment 296, and the shear segment 300, is composed of a plastic material (e.g., by injection molding) and is unitary. The first and second segments 292, 296 both have hexagonal outer surfaces 304, 308 so that a wrench or other tool can be used to engage and rotate the fastener 212. The shear segment 300 connects the first and second segments 292, 296 and is designed to shear off when a desired torque is applied to the second segment 296. The nut 216 can be held by hand or with a tool when tightening the fastener 212. The first segment 292 has the same geometry as the second segment 296 to facilitate rotating and removing the fastener 212 after the second segment 296 is broken off.

In other embodiments, the flange 252 of the bushing 208 could be integrally formed (e.g., by injection molding) with the fastener 212 such that the flange 252 would essentially also be part of the head portion 288 of the fastener 212. In such embodiments, either an ordinary nut or a shear nut (similar to the shear nuts disclosed in U.S. Publication No. 2009/0276944 ('the 944 Publication), the entire contents of which are incorporated by reference herein) could be used to secure the fastener 212 to the toilet bowl 248. The teeth 276 on the flange 252 and the teeth 280 on the hinge post 204 could still help fix the hinge post 204 relative to the toilet bowl 248 when the fastener 212 is tightened and allow for adjustment of the hinge post 204 on the toilet bowl 248 when the fastener 212 is loosened.

Figure 13:
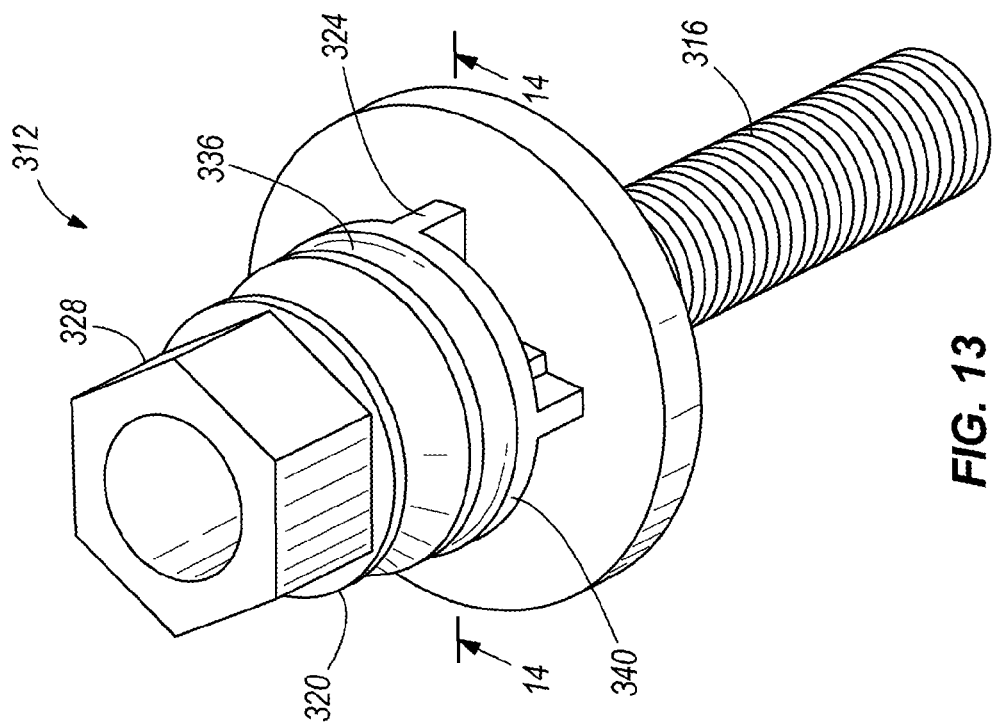
FIG. 13 is a perspective view of an alternative threaded fastener for use with the hinge assembly of FIG. 9.
Figure 14:
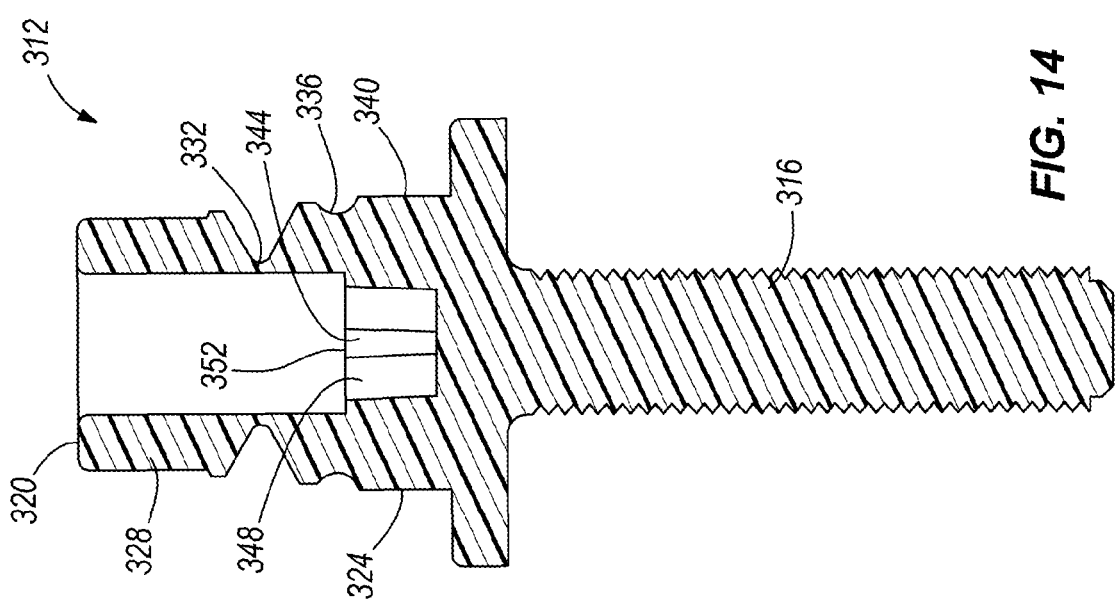
FIG. 14 is a cross-sectional view of the threaded fastener taken along section line 14-14 of FIG. 13.

FIGS. 13 and 14 illustrate another threaded fastener 312 for use with the hinge assembly 200. Similar to the threaded fastener 212 described above, the illustrated fastener 312 includes a threaded portion 316, or shaft, and a head portion 320 having a first segment 324, a second segment 328, and a shear segment 332. The shaft 316, the first segment 324, the second segment 328, and the shear segment 332 are composed of a plastic material and are unitary. In the illustrated embodiment, an annular recess 336 is formed in an outer surface 340 of the first segment 324. The annular recess 336 is configured to be engaged by a quick-release hinge post, similar to the recess 855 illustrated and described in FIGS. 24 and 25 of the '944 Publication. A similar recess can also be formed in the first section 118 of the adaptor 30 shown in FIGS. 1-8.

The illustrated threaded fastener 312 also includes two slots 344, 348 formed in an upward-facing surface 352 of the first segment 324. The slots 344, 348 are formed within a periphery defined by the outer surface 340 of the first segment 324. The illustrated slots 344, 348 are arranged perpendicularly for engagement by a Phillips head screwdriver to rotate the fastener 312. In other embodiments, the fastener 312 may include a single slot for engagement by a flat head screwdriver.

Figure 15:
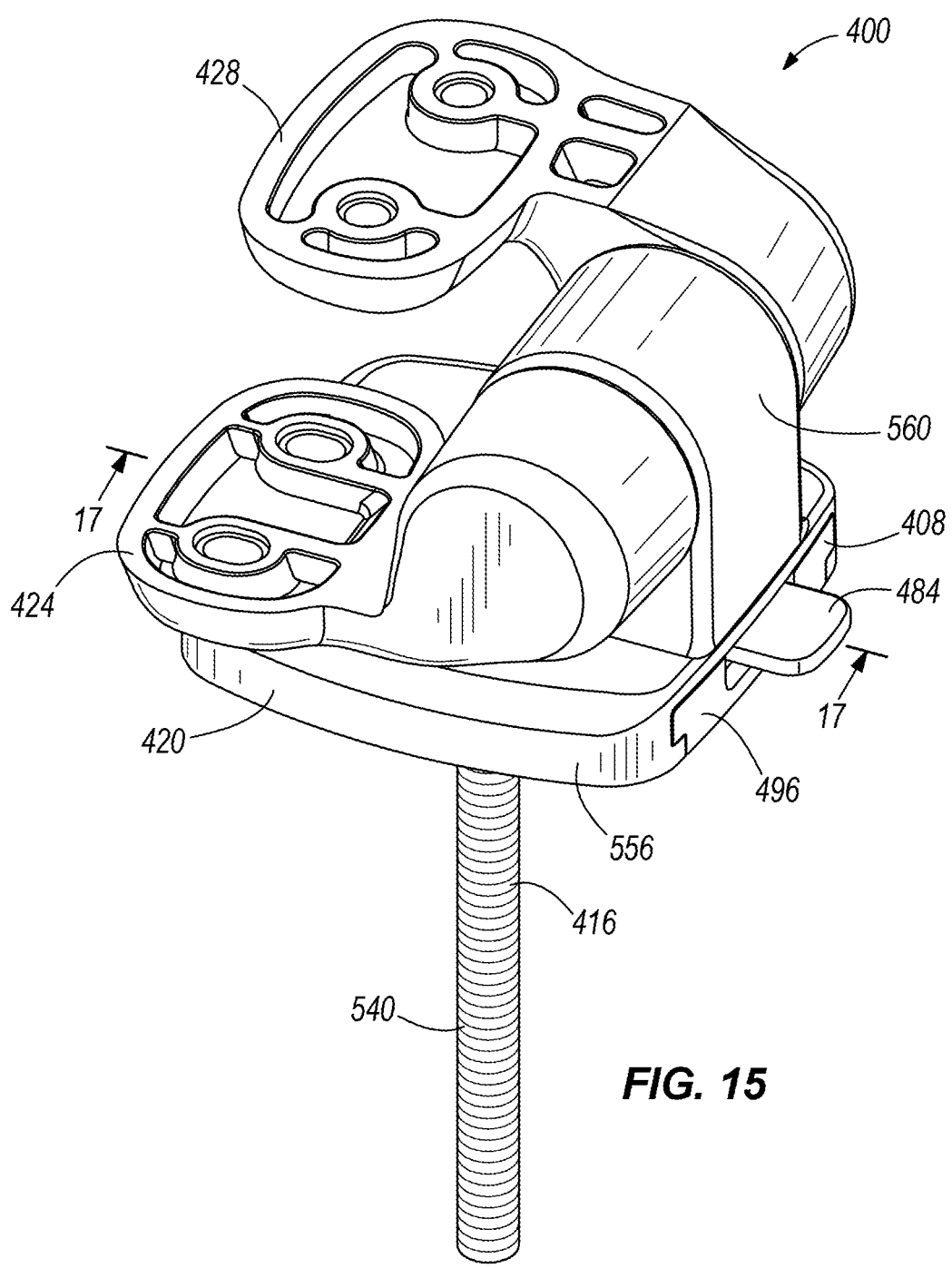
FIG. 15 is a perspective view of yet another hinge assembly embodying the invention.
Figure 16:
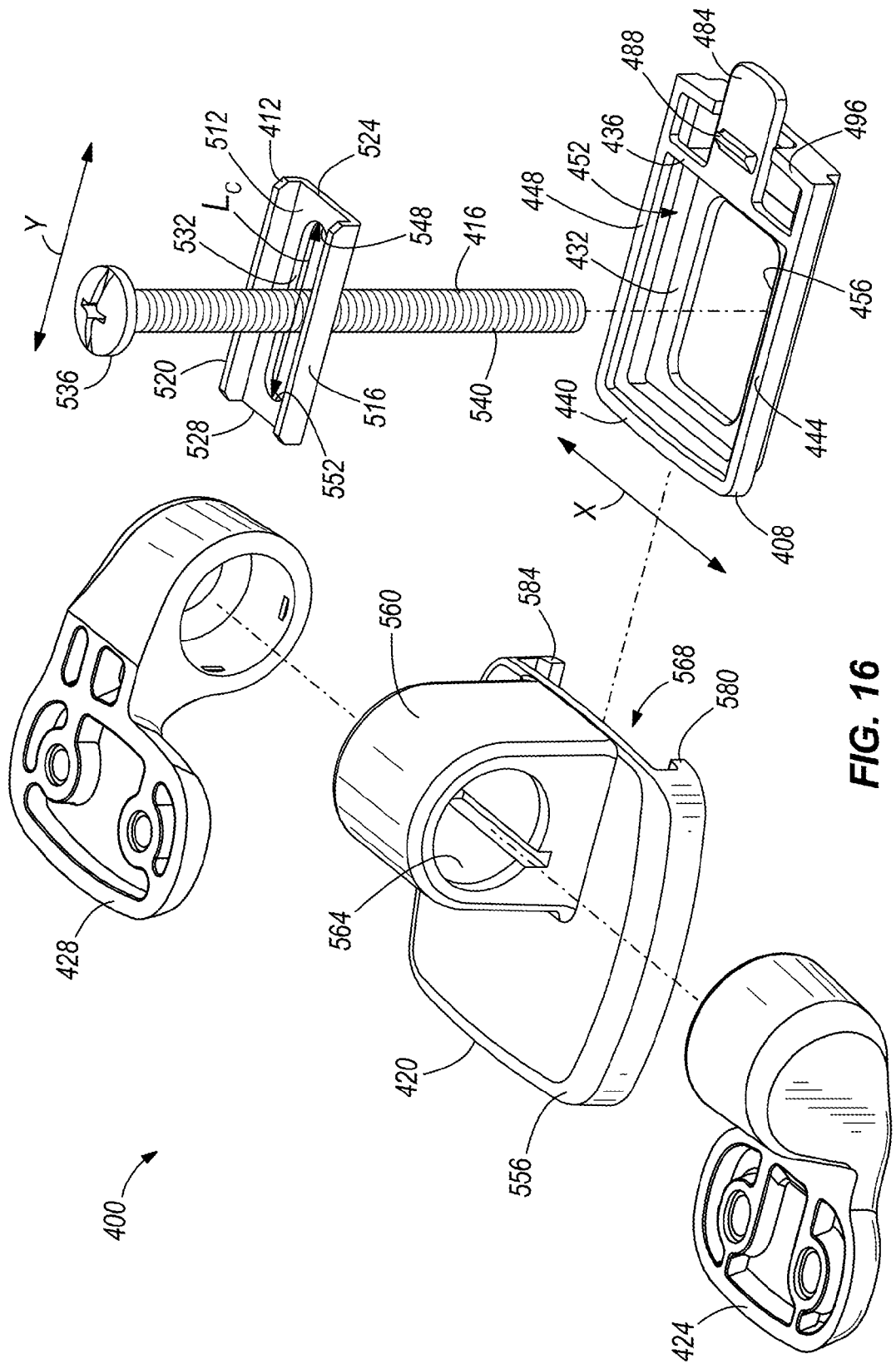
FIG. 16 is an exploded perspective view of the hinge assembly shown in FIG. 15.
Figure 17:
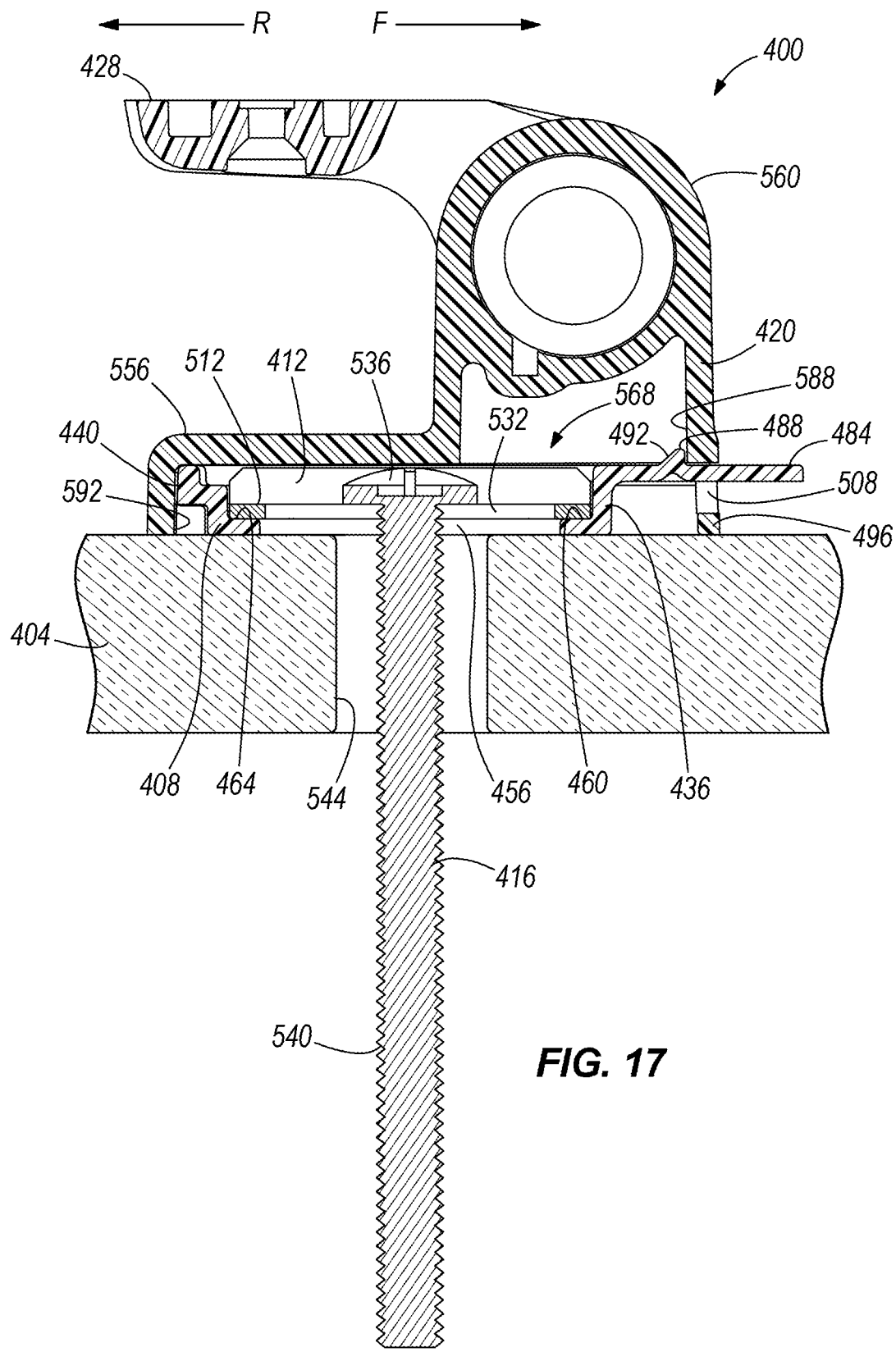
FIG. 17 is a cross-sectional view of the hinge assembly taken along section line 17-17 of FIG. 15.

FIGS. 15-17 illustrate another embodiment of a toilet seat hinge assembly 400 for coupling a toilet seat and/or lid to a toilet bowl 404. The illustrated hinge assembly 400 includes a mounting plate 408, a clip 412, a threaded fastener 416, a hinge post 420, and two hinge leaves 424, 428.

Figure 18:
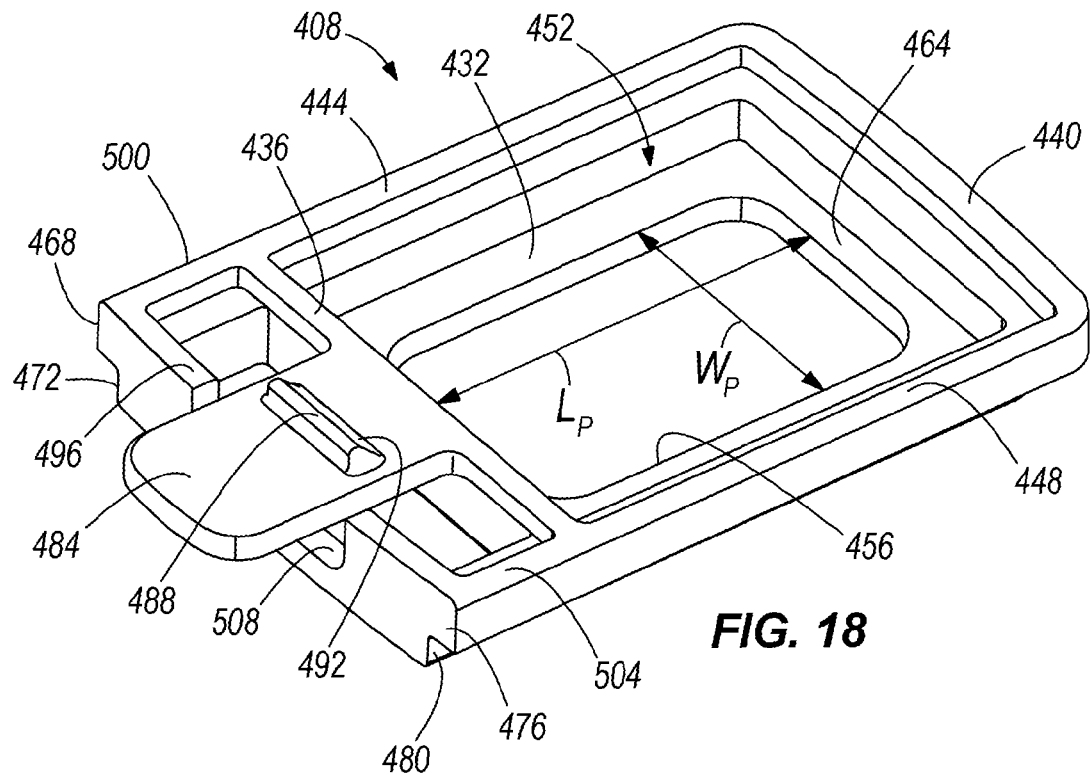
FIG. 18 is a perspective view of a mounting plate of the hinge assembly of FIG. 15.

As shown in FIGS. 16 and 18, the mounting plate 408, or first member, includes a bottom wall 432, a front wall 436, a rear wall 440, and two side walls 444, 448. The front wall 436, the rear wall 440, and the side walls 444, 448 all extend upwardly from the bottom wall 432 to define a plate cavity 452. A plate opening 456 is formed through the bottom wall 432 in communication with the plate cavity 452. The bottom wall 432 includes a front ledge 460 between the plate opening 456 and the front wall 436, and a rear ledge 464 between the plate opening 456 and the rear wall 440. The first side wall 444 is positioned outside of the plate opening 456 and includes an outwardly extending first wing or shoulder 468 that extends the length of the side wall 444. The first shoulder 468 defines an undercut 472 in the first side wall 444. The second side wall 448 is positioned outside of the plate opening 456 opposite the first side wall 444 and includes an outwardly extending second wing or shoulder 476 that extends the length of the side wall 448. The second shoulder 476 defines an undercut 480 in the second side wall 448.

The mounting plate 408 also includes a tab 484 extending from the front wall 436 away from the plate cavity 452. The tab 484 is deflectable between a locked position and an unlocked position and is biased to the locked position. As shown in FIG. 17, when in the locked position, the tab 484 extends substantially parallel to the bottom wall 432 and substantially perpendicular to the front wall 436. When in the unlocked position, the tab 484 is angled obliquely relative to the bottom wall 432 and the front wall 436. The tab 484 includes an upwardly extending projection 488. The projection 488 includes an angled surface 492 on the side of the projection 488 closer to the front wall 436.

As shown in FIGS. 16 and 18, the mounting plate 408 further includes a forward wall 496. The forward wall 496 is positioned forward of the front wall 436 and is connected to the front wall 436 by extensions 500, 504 of the side walls 444, 448. A recess 508 is formed in the upper surface of the forward wall 496. The recess 508 provides clearance for the tab 484 such that the tab 484 can extend through the forward wall 496 and be depressed to the unlocked position. In other embodiments, the forward wall 496 and the front wall 436 may be a single continuous wall that defines the recess 508. In still other embodiments, the forward wall 496 and the side wall extensions 500, 504 may be omitted.

As shown in FIG. 16, the clip 412, or second member, includes a horizontal plate 512 and two clip side walls 516, 520. The side walls 516, 520 extend from a front end 524 to a rear end 528 of the plate 512 on opposite sides of the plate 512. An elongated clip opening 532 is defined in the plate 512 between the front and rear ends 524, 528. As shown in FIG. 17, the clip 412 is positioned in the plate cavity 452 of the mounting plate 408 so that the clip 412 engages and is supported by the front ledge 460 and the rear ledge 464. In addition, the front end 524 of the clip 412 abuts the front wall 436 of the plate 408, the rear end 528 of the clip 412 abuts the rear wall 440 of the plate 408, and the clip opening 532 overlaps the plate opening 456. The clip 412 is thereby movable relative to the plate 408 in a horizontal side-to-side direction X within the plate cavity 452.

In the illustrated embodiment, the fastener 416 is a conventional bolt including a head 536 and a threaded shaft 540. The head 536 engages and is supported by an upper surface of the horizontal plate 512 of the clip 412. The illustrated head 536 is a Phillips head, but may alternatively be a flat head, a hex head, or any other type of head suitable for engagement and rotation by a tool. The shaft 540 extends through the clip opening 532 and the plate opening 456 into a bore 544 (FIG. 17) in the toilet bowl 404. The shaft 540 is movable within the clip opening 532 in a horizontal front-to-back direction Y from a first end 548 of the opening 532 to a second end 552 of the opening 532. The fastener 416 can be tightened to the toilet bowl 404 with a nut to fix the location of the shaft 540 within the clip opening 532. Tightening the fastener 416 also clamps the clip 412 and the mounting plate 408 between the head 536 and the toilet bowl 404, preventing front-to-back and side-to-side movement of the mounting plate 408 on the toilet bowl 404. In some embodiments, the fastener 416 may include a shear head (similar to the threaded fasteners of FIGS. 1-14) or the nut may be a shear nut (similar to the nuts disclosed in the '944 Publication).

Figure 19:
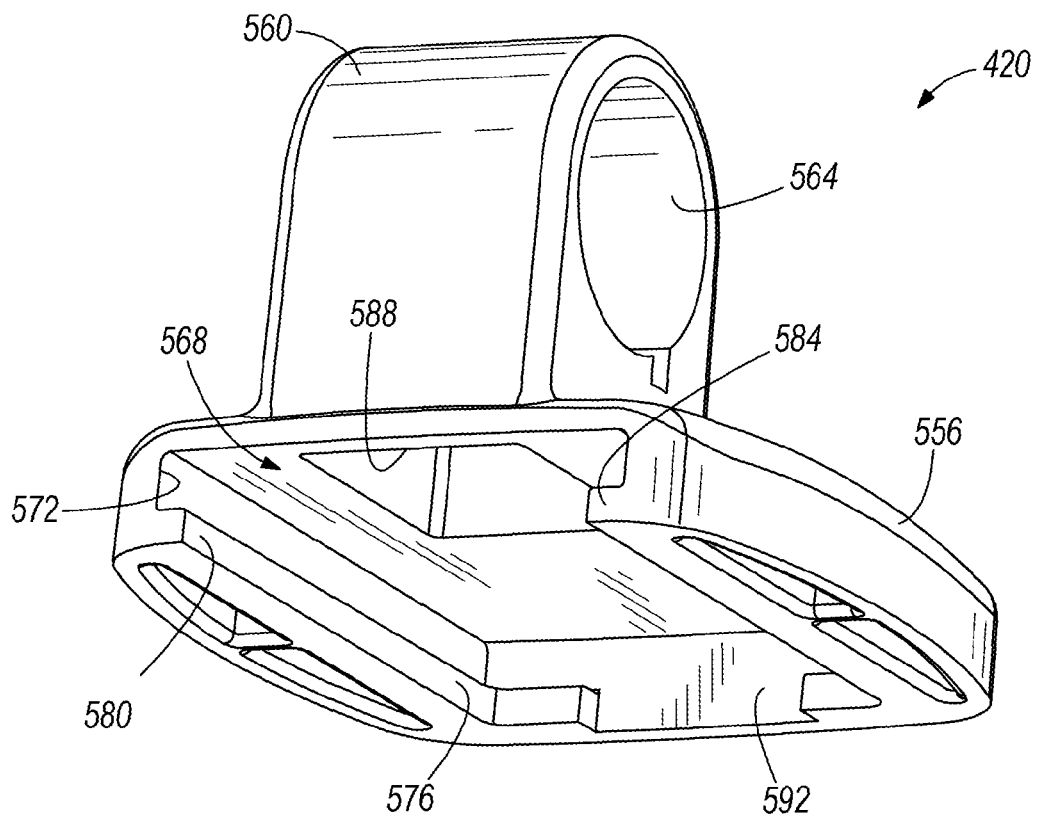
FIG. 19 is a bottom perspective view of a hinge post of the hinge assembly of FIG. 15.
Figure 20:
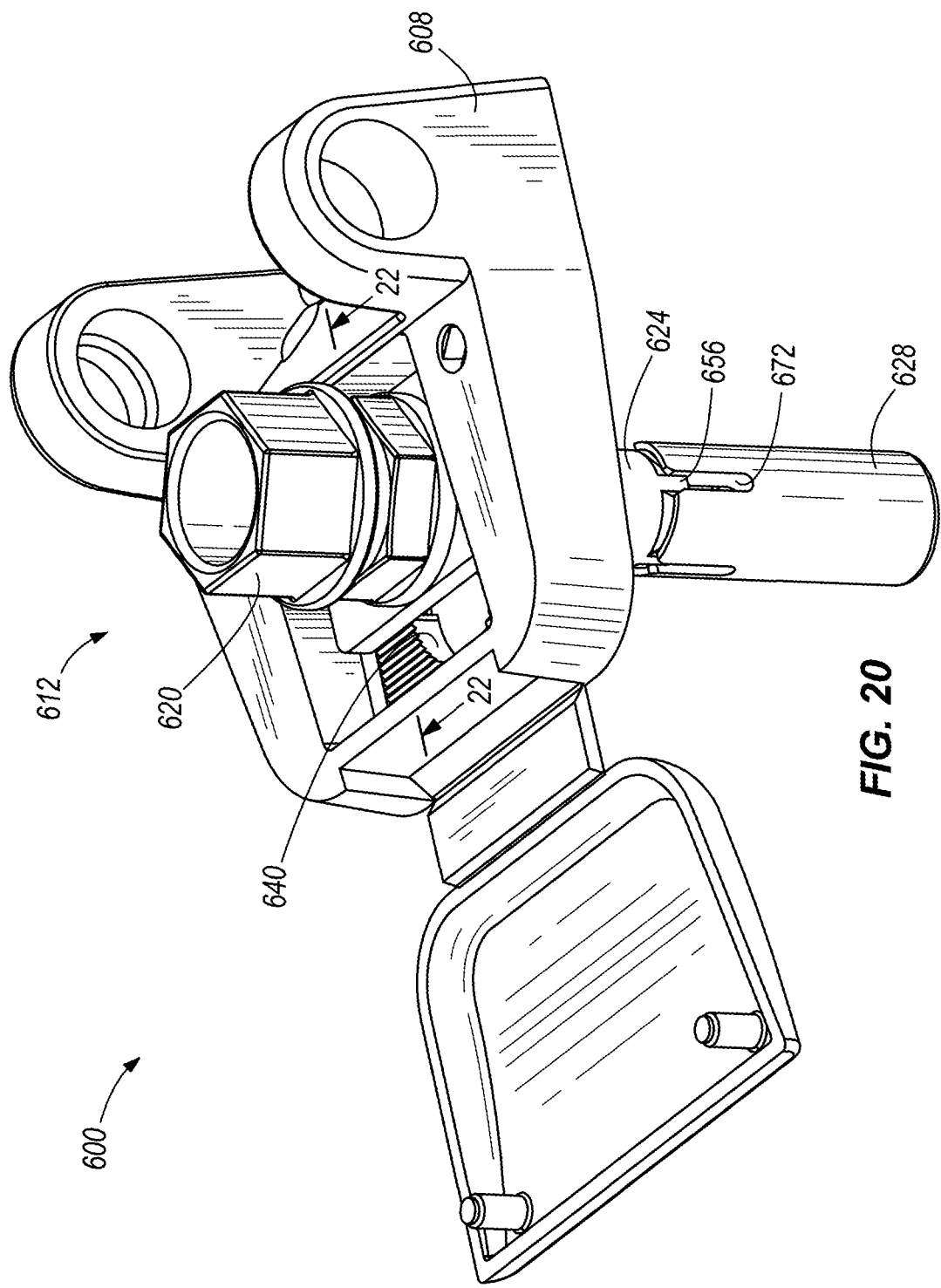
FIG. 20 is a perspective view of another hinge assembly embodying the invention.

As shown in FIG. 19, the hinge post 420 includes a base portion 556 and a post portion 560. The post portion 560 extends upwardly from the base portion 556 and defines an opening 564 for pivotally coupling the hinge leaves 424, 428 to the hinge post 420. The base portion 556 defines a base cavity 568 having a front opening 572 and a bottom opening 576. The base portion 556 also includes two inwardly extending side ledges 580, 584 that extend along each side of the cavity 568. As shown in FIG. 17, a lip 588 is formed generally above the cavity 568 and is configured to engage the projection 488 on the tab 484 of the mounting plate 408. In other embodiments, the tab 484 may extend from the hinge post 420 and the lip 588 may be formed on the mounting plate 408.

Referring back to FIGS. 15 and 16, the hinge leaves 424, 428 are pivotally coupled to the hinge post 420 by a pin (not shown). The first leaf 424 is configured to be coupled to a toilet seat or ring. The second leaf 428 is configured to be coupled to a toilet lid or cover. In other embodiments, the seat and the lid may be pivotally connected to the hinge post 420 in any manner, including without hinge leaves. In some embodiments, the toilet seat hinge assembly 400 may be a slow-close hinge.

As shown in FIG. 16, the plate opening 456 and the clip opening 532 have dimensions that are larger than an outer diameter of the fastener 416 such that the mounting plate 408 and the clip 412 are movable relative to the fastener 416. In particular, the plate opening 456 has a length $L_P$ and a width $W_P$ (FIG. 18) that are larger than the outer diameter of the fastener 416 so that the clip 412 is movable from side-to-side in the horizontal direction X within the plate cavity 452. The clip 412 contacts the first side wall 444 of the plate 408 at one extreme and contacts the second side wall 448 of the plate 408 at the other extreme. In addition, the clip opening 532 has a length $L_C$ that is larger than the outer diameter of the fastener 416 so that the fastener 416 is movable from front-to-back in the horizontal direction Y within the clip opening 532. The fastener 416 contacts the first end 548 of the opening 532 at one extreme and contacts the second end 552 of the opening 532 at the other extreme. Movement in these two horizontal directions X, Y allows the position of the mounting plate 408 to be adjusted relative to the bore 544 in the toilet bowl 404. This positional adjustability allows the hinge assembly 400 to compensate for differences in spacing of bores in different toilet bowls, as compared to the spacing of the hinge attachment points on the toilet seat and the lid, and to adjust the location of the seat and the lid over different toilet bowls. After the mounting plate 408 is positioned as desired on the toilet bowl 404, the fastener 416 is tightened to secure the mounting plate 408 and the clip 412 to the toilet bowl 404.

The hinge post 420 is then secured to the mounting plate 408 by sliding the post 420 along the toilet bowl 404 and onto the plate 408 in a forward horizontal direction F (FIG. 17). The rear wall 440 of the mounting plate 408 enters the hinge post 420 through the front opening 572 so that the base cavity 568 receives the mounting plate 408 and the clip 412. As the hinge post 420 is slid onto the mounting plate 408, the first ledge 580 of the hinge post 420 slides into the first undercut 472 of the plate 408, capturing the ledge 580 between the first shoulder 468 and the toilet bowl 404. In addition, the second ledge 584 of the hinge post 420 slides into the second undercut 480 of the plate 408, capturing the ledge 584 between the second shoulder 476 and the toilet bowl 404. The shoulders 468, 476 and the ledges 580, 584 prevent the hinge post 420 from lifting away from the toilet bowl 404 after the hinge post 420 is installed.

As the hinge post 420 is slid on the mounting plate 408, the tab 484 is automatically depressed to the unlocked position by the hinge post 420. In particular, the angled surface 492 of the projection 488 engages and rides under an edge of the hinge post 420 to deflect the tab 484 toward the toilet bowl 404. This allows the projection 488 to pass through the front opening 572 of the hinge post 420 and into the base cavity 568. Once the mounting plate 408 is sufficiently within the cavity 568, the tab 484 automatically snaps into the locked position (FIG. 17) so that the projection 488 engages the lip 588 to inhibit movement of the hinge post 420 in a rearward horizontal direction R off of the mounting plate 408. As shown in FIG. 17, when the mounting plate 408 is fully inserted into the base cavity 568, the projection 488 engages the lip 588, the rear wall 440 of the plate 408 abuts an inner wall 592 of the hinge post 420, and the forward wall 496 of the plate 408 is flush with an outer surface of the hinge post 420. In this position, the tab 484 extends outwardly from the hinge post 420 in the forward horizontal direction F.

To remove the hinge post 420 from the mounting plate 408, a user manually depresses the tab 484 toward the toilet bowl 404 to the unlocked position. In this position, the projection 488 on the tab 484 disengages the lip 588 such that the hinge post 420 can be slid off of the mounting plate 408 in the rearward horizontal direction R.

FIGS. 20-23 illustrate another embodiment of a toilet seat hinge assembly 600 for coupling a toilet seat and/or lid to a toilet bowl 604. The hinge assembly 600 includes a hinge post 608 and a fastener assembly 612 to secure the hinge post 608 to the toilet bowl 604. The fastener assembly 612 includes a threaded fastener 616, an adaptor 620, a bushing 624, and an expandable nut 628. The hinge post 608, the threaded fastener 616, and the adaptor 620 are substantially the same as the hinge post 18, the threaded fastener 26, and the adaptor 30 discussed above. Only differences between the bushing 624 and the nut 628 of the illustrated hinge assembly 600 compared to the bushing 34 and the nut 38 of the hinge assembly 10 described with reference to FIGS. 1-7 are discussed in detail below.

Figure 21:
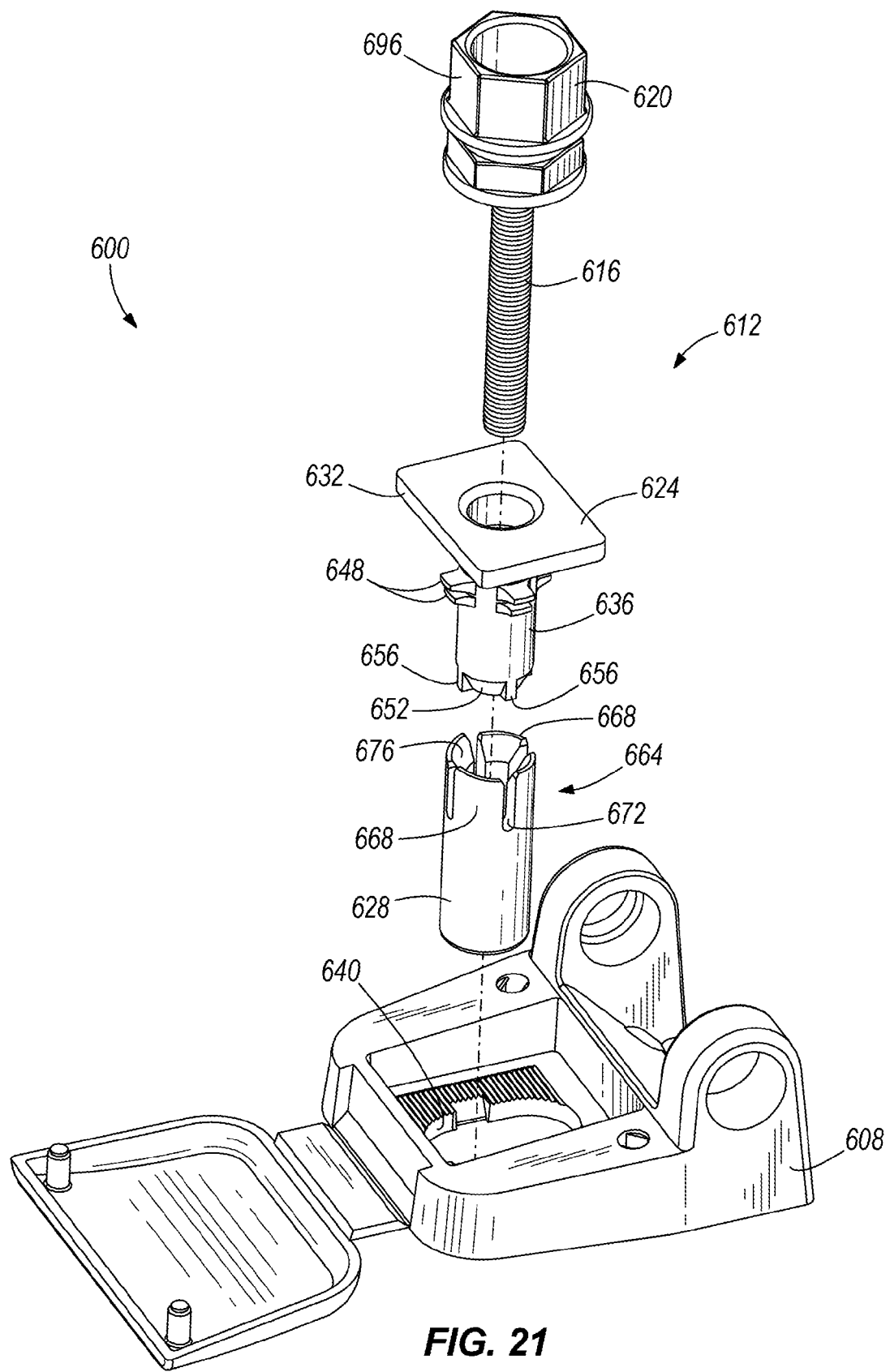
FIG. 21 is an exploded perspective view of the hinge assembly shown in FIG. 20.
Figure 22:
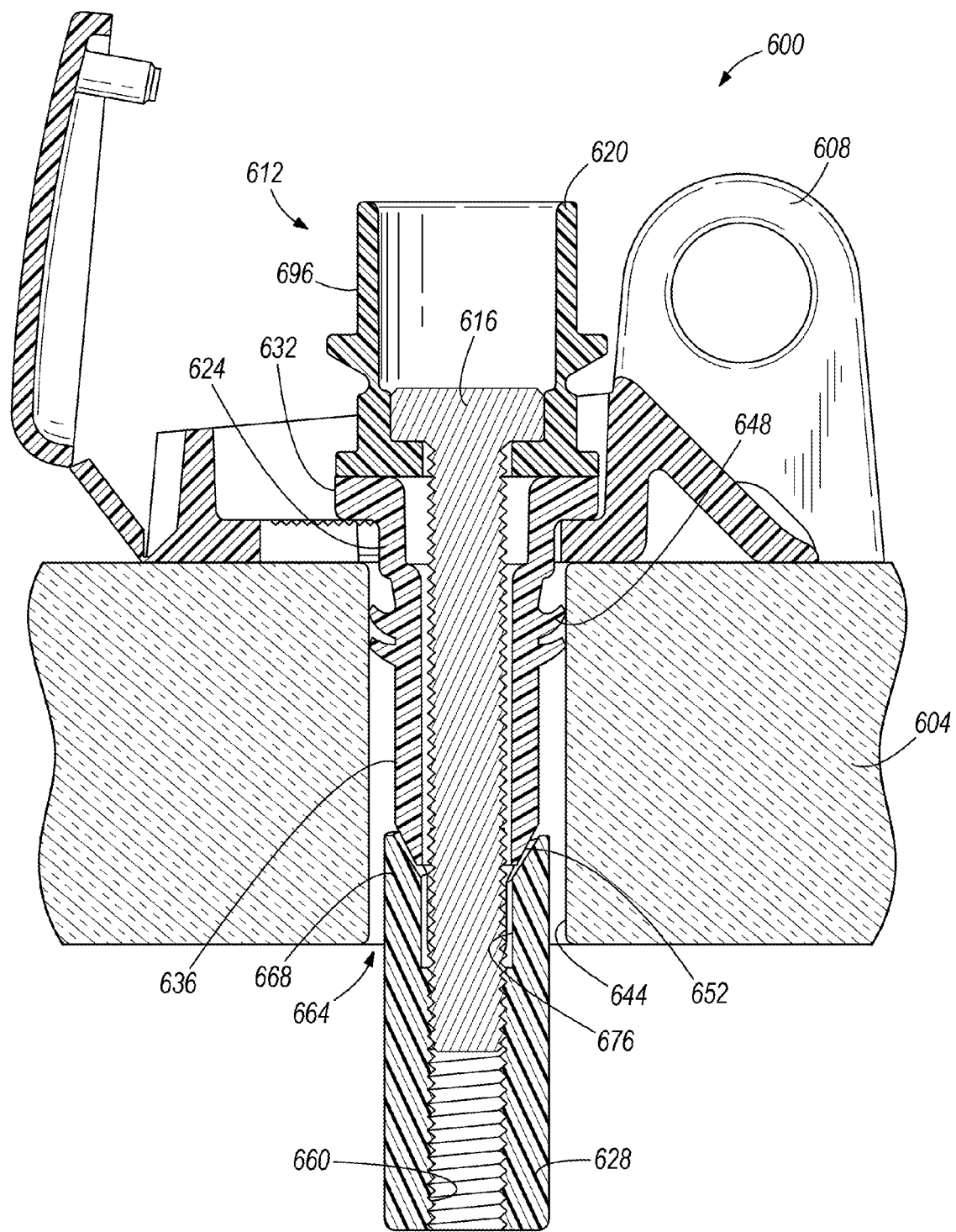
FIG. 22 is a cross-sectional view of the hinge assembly taken along section line 22-22 of FIG. 20.
Figure 23:
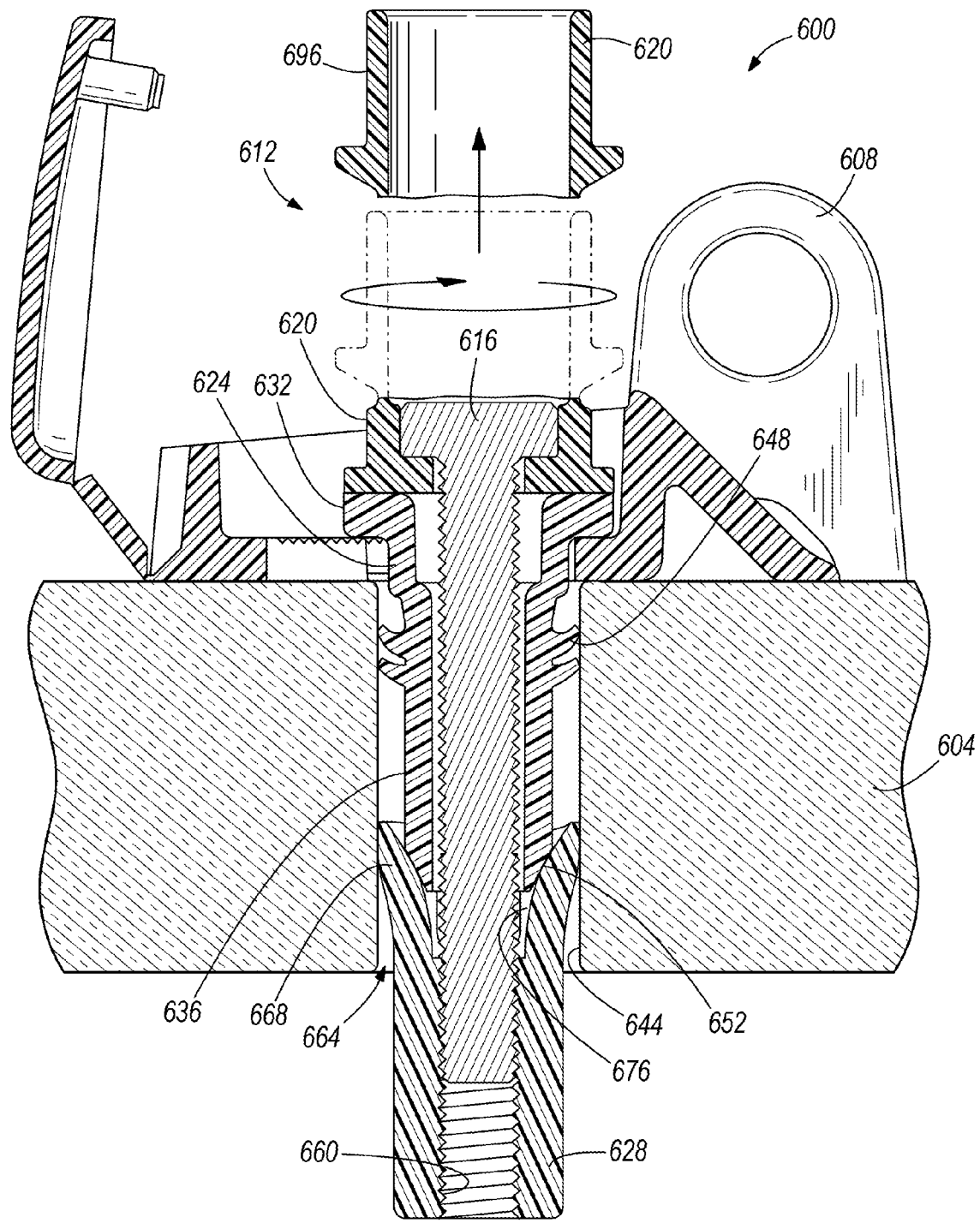
FIG. 23 is another cross-sectional view of the hinge assembly shown in FIG. 20, illustrating a nut expanding within a bore of a toilet bowl.

As shown in FIGS. 21-23, the illustrated bushing 624 includes a rectangular flange 632 and a lower section 636. The lower section 636 extends through an opening 640 in the hinge post 608 and into a bore 644 in the toilet bowl 604. The bushing 624 also includes four sets of two projections 648 extending radially outward from the lower section 636. The flange 632 and the projections 648 function in a similar manner to the flange 138 and the projections 146 of the bushing 34 discussed above. In the illustrated embodiment, the lower section 636 of the bushing 624 includes a frustoconical lower surface 652 formed on an end of the bushing 624 opposite the flange 632. The frustoconical surface 652 tapers inward toward the lower end of the bushing 624. The lower section 636 also includes four ribs 656 extending from the frustoconical lower surface 652. The ribs 656 are evenly spaced (e.g., spaced approximately ninety degrees apart) around the perimeter of the lower section 636. In other embodiments, the lower section 636 may include fewer or more ribs 656.

The nut 628 includes a lower section with a threaded inner surface 660 that engages the threaded fastener 616 to threadably couple the nut 628 to the fastener 616. The illustrated nut 628 also includes an expandable upper section 664 having four axially extending segments 668 that extend upward from the lower section and that are separated by slots 672 (FIG.

21). The slots 672 are spaced approximately ninety degrees apart around the nut 628 and correspond to the ribs 656 of the bushing 624. An inner surface 676 of the expandable section 664 is unthreaded such that the nut 624 is spaced apart from and does not engage the fastener 616 at the expandable section 664. Rather, the unthreaded inner surface 676 is tapered or frustoconical adjacent ends 680 (FIG. 24) of the segments 668. The surface 676 tapers outward toward the upper ends 680 so as to receive the frustoconical lower surface 652 of the bushing 624. As the nut 628 moves upward along the fastener 616 due to relative rotation of the nut and the fastener, the bushing 624 enters the nut 628 and expands the expandable section 664 of the nut 628 to secure the hinge post 608 to the toilet bowl 604. This is further explained below.

In the illustrated embodiment, the nut 628 is generally cylindrical and has an outer diameter that is smaller than an inner diameter of the bore 644 in the toilet bowl 604 when the expandable section 664 is not expanded such that the fastener assembly 612 can be inserted or dropped through the bore 644 from the top.

Figure 24:
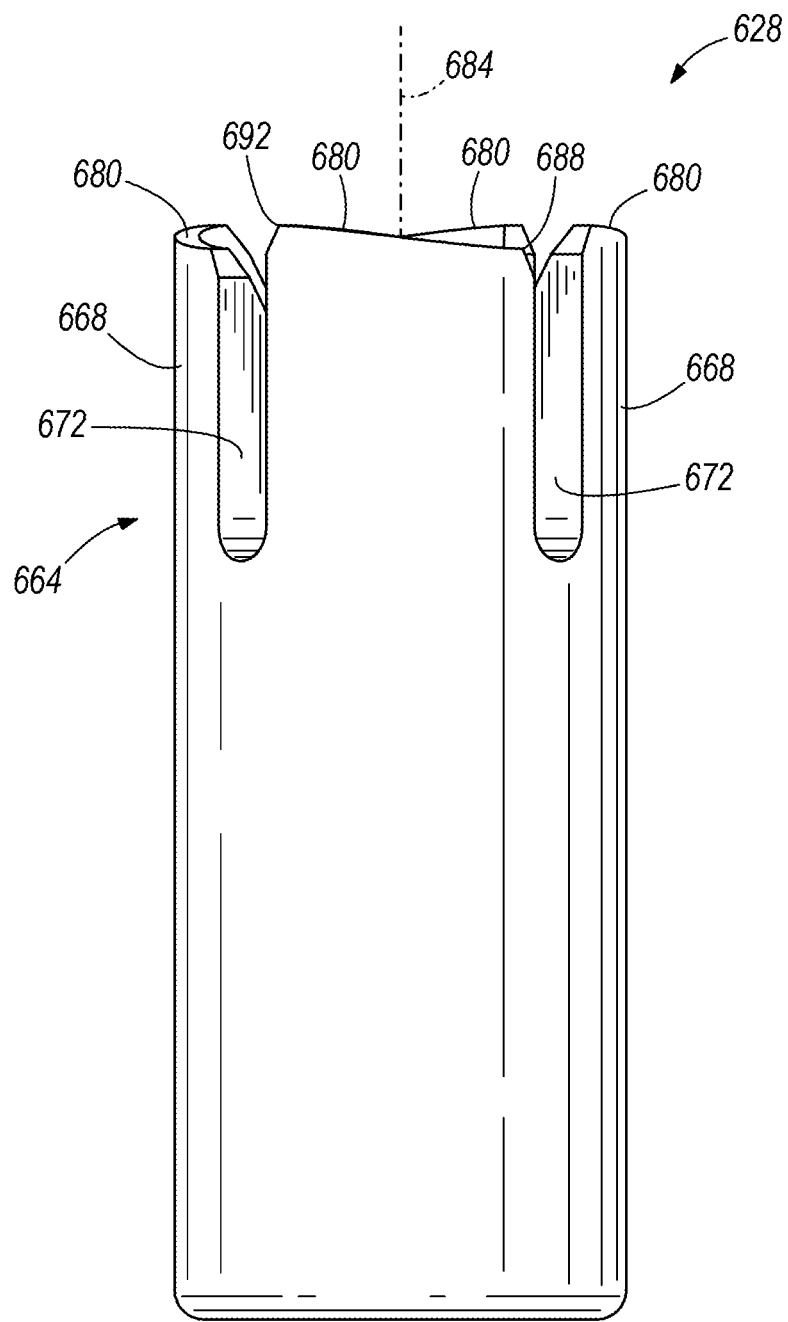
FIG. 24 is a side view of the nut for use with the hinge assembly shown in FIG. 20.

As shown in FIG. 24, the upper end 680 of each axially extending segment 668 is obliquely angled relative to a longitudinal axis 684 of the nut 628, or relative to a plane perpendicular to the axis 684. In particular, one side 688 of each segment end 680 is lower (i.e., closer to a bottom of the adjacent slot 672) than the other side 692 of the segment end 680. In the illustrated embodiment, the segment ends 680 are obliquely angled such that the lower side 688 is approximately 0.025 inches lower than the higher side 692. In other embodiments, the segment ends 680 may be obliquely angled a greater or lesser degree. When the nut 628 is initially threaded onto the fastener 616, with the fastener 616 extending through the bushing 624, the nut 628 can be rotated until the upper ends 680 of the nut segments 668 hit the lower ends of the ribs 656. Alternatively, the nut 628 can be held stationary and the fastener 616 can be rotated, or both can be rotated, until the upper ends 680 of the nut segments 668 hit the lower ends of the ribs 656. Once the ends 680 hit the ribs 656, only the fastener 616 is rotated. Initially the nut rotates with the fastener, and the relative movement between the nut 628 and the bushing 624 causes the lower end of each rib 656 to move along the respective upper end 680 in the direction from the high side 692 toward the low side 688 until the rib 656 hits the high side 692 of the adjacent segment 668. Engagement between the ribs 656 and the high sides 692 of the segments 668 prevents further relative rotation between the nut 628 and the bushing 624, and further rotation of the fastener 616 relative to the bushing 624 causes each rib 656 to move downward into the aligned slot 672 as the nut 628 moves upward along the fastener.

As the fastener 616 is rotated relative to the hinge post 608 and relative to the bushing 624, the ribs 656 on the bushing 624 prevent the nut 628 from rotating with the fastener 616 relative to the bushing 624. Rather, the nut 628 moves axially along the fastener 616 toward the hinge post 608. The bushing 624 has a larger outer diameter than the inner diameter of the nut 628 such that the frustoconical surface 652 of the bushing 624 pushes the nut segments 668 radially outward to expand the nut 628. As the nut 628 expands, the segments 668 engage the inner surface of the bore 644 to secure the nut 628 and the threaded fastener 616 within the bore 644, thereby securing the hinge post 608 to the toilet bowl 604. As the nut 628 engages the inner surface of the bore 644, the nut 628 also increases the torque required to rotate the fastener 616. When the torque reaches the desired level, an upper segment 696 of the adaptor 620 will shear off and separate from the fastener assembly 612 (see FIG. 23).

When the nut segments 668 have expanded to contact the inner surface of the bore 644, the nut 628 is restrained from moving axially relative to the toilet bowl 604. Further tightening of the threaded fastener 616 causes the bushing 624 to be drawn axially downward toward the now stationary nut 628. This downward axial movement of the bushing 624 clamps the hinge post 608 tightly to the upper mounting surface of the toilet bowl 604, thereby improving the security of the hinge post 608 and increasing the ability of the hinge post 608 to remain tight and motionless relative to the toilet bowl 604.

Figure 25:
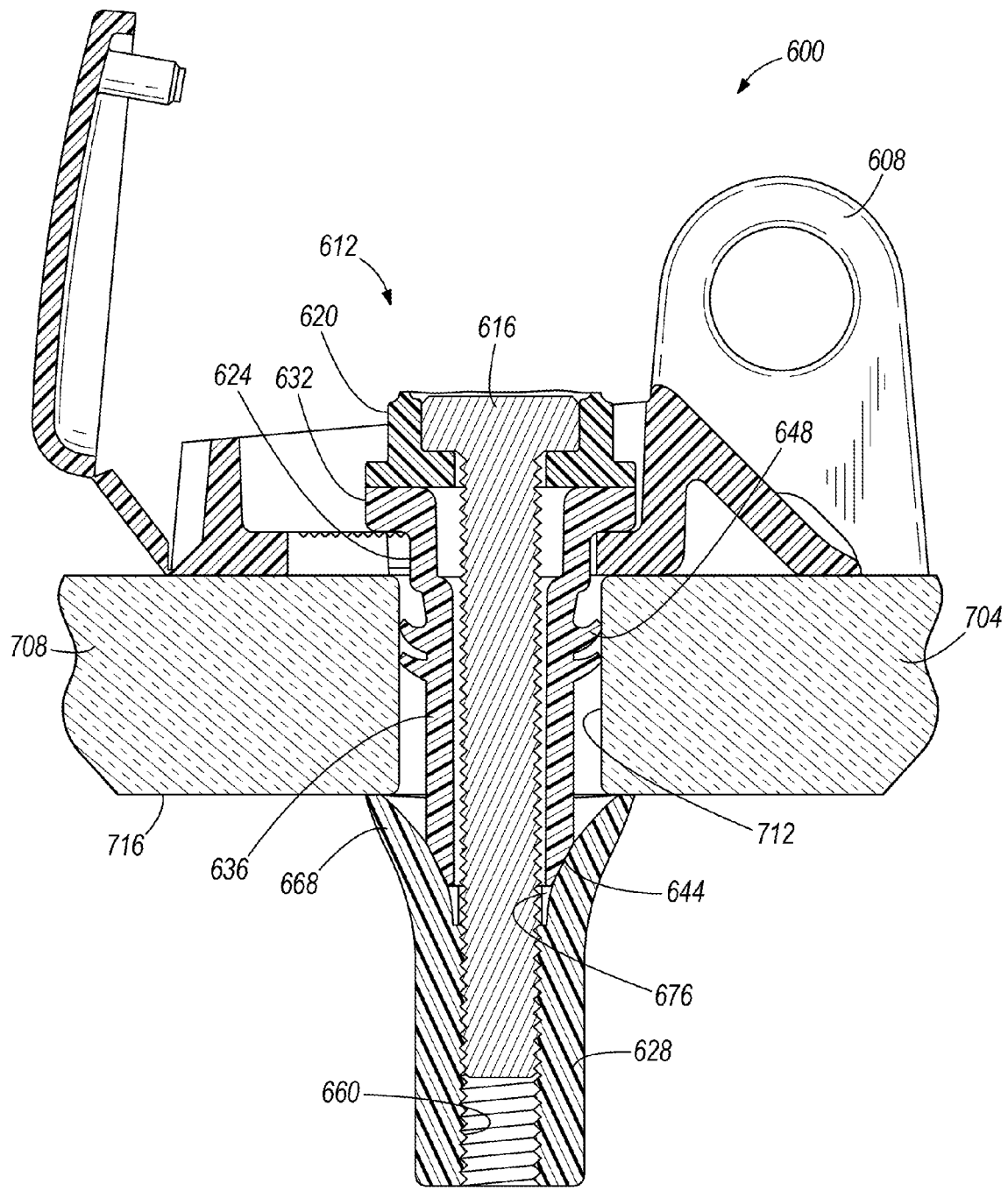
FIG. 25 is a cross-sectional view of the hinge assembly shown in FIG. 20 illustrating the hinge assembly mounted to another toilet bowl.

FIG. 25 illustrates the toilet seat hinge assembly 600 mounted to another toilet bowl 704. The illustrated toilet bowl 704 has a flange 708 that is generally thinner than the flange of the toilet bowl 604 shown in FIGS. 22 and 23. For example, the flange 708 may have a thickness of approximately 0.5 inches. When the hinge assembly 600 is mounted to the toilet bowl 704, the nut segments 668 expand and become larger than a bore 712 in the flange 708. As the nut 628 is expanded by the bushing 624, the nut segments 668 contact and bear against a lower surface 716 of the toilet bowl 704. Once the nut segments 668 contact the lower surface 716, further tightening of the threaded fastener 616 increases the clamping force of the bushing 624 on the hinge post 608 to secure the hinge post 608 to the toilet bowl 704.

The fastener assemblies 22, 612, including the shearable fasteners and/or the expandable bushings or nuts, discussed above or the shear nuts disclosed in the '944 Publication can be used for fastening applications related to a toilet other than securing a toilet seat hinge assembly to a toilet bowl. For example, shearable nuts or bolts can be used to secure a toilet bowl to the floor. A typical toilet bowl has two spaced apart mounting holes. These mounting holes are usually aligned with corresponding bolts extending from the floor so that the bolts extend through the mounting holes. A shearable nut may be threaded onto each bolt and tightened to secure the toilet bowl to the floor. The shear segment of the nut is designed to break at a predetermined torque such that the toilet bowl is properly secured to the floor without cracking or causing other damage to the toilet bowl due to over-tightening of the nut. Typically, a washer is positioned between the toilet bowl and the nut before tightening the nut. This washer can be a component of a pre-assembled nut or can be separate from the nut. The washer can include a boss for mounting a decorative cap or cover to conceal the nut from view after the toilet bowl is secured to the floor.

Alternatively, if one of the fastener assemblies 22, 612 are used, the bolts can be omitted and the fastener assemblies 22, 612 can be dropped through the mounting holes and into holes in the floor instead. In such a scenario, the threaded fastener of a fastener assembly may include a shear segment. The shear segment is designed to break at a predetermined torque such that the toilet bowl is properly secured to the floor without cracking or causing other damage to the toilet bowl due to over-tightening the fastener assembly. In addition, the expandable bushing or nut of the fastener assembly will expand within the hole in the floor to anchor the fastener assembly to the floor without having to reach under the floor.

In further embodiments, the fastener assemblies 22, 612 can be used for securing a toilet tank to a toilet bowl. A typical toilet bowl has two spaced apart mounting holes. A typical toilet tank has two corresponding spaced apart mounting holes. After placing the toilet tank on the toilet bowl and aligning the toilet tank mounting holes with the toilet bowl mounting holes, one of the fastener assemblies 22, 612 can be inserted through each pair of aligned mounting holes. In such a scenario, either the bolt or the nut of a fastener assembly may include a shear segment. The shear segment is designed to break at a predetermined torque such that the toilet tank is properly secured to the toilet bowl without cracking or causing other damage to the toilet tank or the toilet bowl due to over-tightening the fastener assembly.

The directions used to describe the hinge assemblies (e.g., front, back, side, forward, rearward, upper, lower, etc.) correspond to the directions of a hinge assembly when secured to a toilet bowl in one orientation. The directional language should not be regarded as limiting as the hinge assemblies could be oriented in other directions and ways on a toilet bowl and still function as described above. For example, the term "front" as used above could refer to a position to the left, right, or rear of a toilet bowl.

Various features and advantages of the invention are set forth in the following claims.

The invention claimed is:

1. A hinge assembly for mounting a toilet seat to a toilet bowl, the hinge assembly comprising:
   a hinge post;
   a threaded fastener extending through the hinge post and configured to extend into a bore in the toilet bowl;
   a bushing positioned around a portion of the threaded fastener; and
   a nut threadably coupled to the threaded fastener, the nut including an expandable section configured to extend into the bore in the toilet bowl, the expandable section defining at least two slots that divide the expandable section into two axially extending segments to facilitate expansion of the nut;
   wherein the nut has a surface that is engaged by a surface of the bushing so that the expandable section of the nut expands as the nut moves relative to the threaded fastener to secure the hinge post to the toilet bowl; and
   wherein each axially extending segment has an upper end that is obliquely angled relative to a longitudinal axis of the nut such that one side of each segment is relatively shorter than an opposite side of each segment.

2. The hinge assembly of claim 1, wherein the nut is generally cylindrical and has an outer diameter configured to be smaller than an inner diameter of the bore in the toilet bowl when the expandable section is not expanded.

3. The hinge assembly of claim 1, wherein the nut includes a threaded inner surface that engages the threaded fastener, and wherein the surface of the nut that is engaged by the bushing is an unthreaded inner surface of the expandable section.

4. The hinge assembly of claim 1, wherein the expandable section of the nut is located at the upper end of the nut.

5. The hinge assembly of claim 1, wherein the surface of the bushing that engages the nut includes a frustoconical lower surface, and wherein the frustoconical lower surface enters the expandable section of the nut as the nut moves relative to the threaded fastener.

6. The hinge assembly of claim 5, wherein the bushing includes a rib, and wherein the rib fits within one of the at least two slots of the nut to inhibit the nut from rotating relative to the bushing.

7. The hinge assembly of claim 6, wherein the rib extends from the frustoconical lower surface of the bushing.

8. The hinge assembly of claim 1, wherein the bushing is a separate component from the hinge post.

9. The hinge assembly of claim 8, wherein the hinge post defines an opening and includes an upper surface that surrounds the opening, and wherein the bushing includes a flange that is supported by the upper surface of the hinge post over the opening.

10. The hinge assembly of claim 9, wherein the hinge post is movable relative to the threaded fastener and the bushing to adjust a position of the hinge post on the toilet bowl.

11. The hinge assembly of claim 10, wherein the hinge post includes a first series of teeth formed on the upper surface, wherein the flange of the bushing includes a lower surface and a second series of teeth formed on the lower surface, and wherein the first series of teeth engages the second series of teeth to inhibit movement of the hinge post relative to the bushing when the threaded fastener is tightened.

12. The hinge assembly of claim 1, wherein the bushing includes a plurality of projections extending radially outward therefrom, wherein the plurality of projections is configured to engage an inner surface of the bore in the toilet bowl, and wherein at least some of the plurality of projections are configured to deform as the bushing is inserted into the bore in the toilet bowl to conform to the shape of the bore.

13. The hinge assembly of claim 1, further comprising an adaptor having a first segment coupled to the threaded fastener, a second segment, and a shear segment connecting the first and second segments, wherein the first and second segments are both configured to be engaged by a tool to rotate the threaded fastener, and wherein the shear segment has a lower torque resistance than the first and second segments such that the shear segment breaks when a torque applied to the second segment reaches a predetermined amount.

14. The hinge assembly of claim 1, wherein the hinge post defines an opening, and wherein the nut has an outer diameter that, before the expandable section is expanded, is smaller than the opening in the hinge post such that the nut is insertable through the opening with the threaded fastener and the bushing.

15. The hinge assembly of claim 13, wherein the threaded fastener includes a bolt having a head, and wherein the head is fit into the adaptor such that the first segment of the adaptor surrounds the head.

16. A fastener assembly comprising:
   a threaded fastener having a first end portion and a second end portion;
   an adaptor having a first segment coupled to the first end portion of the threaded fastener to inhibit rotation of the adaptor relative to the threaded fastener, a second segment, and a shear segment connecting the first and second segments, the first and second segments both configured to be engaged by a tool to rotate the threaded fastener, the shear segment having a lower torque resistance than the first and second segments such that the shear segment breaks when a torque applied to the second segment reaches a predetermined amount;
   a nut threadably coupled to the second end portion of the threaded fastener; and
   a bushing positioned around a portion of the threaded fastener between the adaptor and the nut;
   wherein one of the nut and the bushing includes an expandable section, and wherein the expandable section has a surface that is engaged by a surface of the other of the nut and the bushing so that the expandable section expands as the nut moves relative to the threaded fastener; and
   wherein the threaded fastener includes a bolt having a head at the first end portion, and wherein the head is fit into the adaptor such that the first segment of the adaptor surrounds the head.

17. The fastener assembly of claim 16, wherein the surface of the other of the nut and the bushing that engages the expandable section includes a frustoconical surface, and wherein the frustoconical surface enters the expandable section as the nut moves relative to the threaded fastener.

18. The fastener assembly of claim 17, wherein the expandable section defines at least two slots to facilitate expansion of the one of the nut and the bushing.

19. The fastener assembly of claim 18, wherein the at least two slots divide the expandable section into at least two axially extending segments, and wherein the at least two axially extending segments deflect radially outward as the nut moves relative to the threaded fastener.

20. The hinge assembly of claim 19, wherein each axially extending segment has an end that is obliquely angled relative to a longitudinal axis of the nut such that one side of each segment is relatively shorter than an opposite side of each segment.

21. The fastener assembly of claim 18, wherein the other of the nut and the bushing includes a rib, and wherein the rib fits within one of the at least two slots to inhibit the nut from rotating relative to the bushing.

22. The fastener assembly of claim 21, wherein the rib extends from the frustoconical surface of the other of the nut and the bushing.

23. The fastener assembly of claim 16, wherein the bushing includes a flange.

24. The fastener assembly of claim 16, wherein the bushing includes a plurality of projections extending radially outward therefrom, and wherein at least some of the plurality of projections are configured to deflect as the bushing is inserted into a bore to conform to the shape of the bore.

25. The fastener assembly of claim 16, wherein the nut is generally cylindrical.

26. A hinge assembly for mounting a toilet seat to a toilet bowl, the hinge assembly comprising:
a hinge post defining an opening and including an upper surface that surrounds the opening;
a threaded fastener extending through the opening of the hinge post and configured to extend into a bore in the toilet bowl, the threaded fastener having a first end portion and a second end portion;
an adaptor having a first segment coupled to the first end portion of the threaded fastener, a second segment, and a shear segment connecting the first and second segments, the first and second segments both configured to be engaged by a tool to rotate the threaded fastener, the shear segment having a lower torque resistance than the first and second segments such that the shear segment breaks when a torque applied to the second segment reaches a predetermined amount;
a bushing positioned around a portion of the threaded fastener, the bushing having a flange and a lower section configured to extend into the bore in the toilet bowl, the flange supported by the upper surface of the hinge post over the opening, the lower section having an outer diameter that is smaller than the opening in the hinge post such that the hinge post is movable relative to the threaded fastener and the bushing to adjust a position of the hinge post on the toilet bowl; and
a nut threadably coupled to the second end portion of the threaded fastener, the nut including an expandable upper section configured to extend into the bore in the toilet bowl;
wherein the nut has a surface that is engaged by a surface of the bushing so that the expandable section of the nut expands as the nut moves relative to the threaded fastener to secure the hinge post to the toilet bowl; and
wherein the nut has an outer diameter that, before the expandable section is expanded, is smaller than the opening in the hinge post such that the nut is insertable through the opening with the threaded fastener and the bushing.

27. The hinge assembly of claim 26, wherein the expandable upper section of the nut defines at least two slots that divide the expandable upper section into two axially extending segments to facilitate expansion of the nut.

28. The hinge assembly of claim 27, wherein each axially extending segment has an upper end that is obliquely angled relative to a longitudinal axis of the nut such that one side of each segment is relatively shorter than an opposite side of each segment.

29. The hinge assembly of claim 26, wherein the threaded fastener includes a bolt having a head at the first end portion, and wherein the head is fit into the adaptor such that the first segment of the adaptor surrounds the head.

\* \* \* \* \*